United States Patent
Kawabe et al.

(10) Patent No.: US 12,183,375 B1
(45) Date of Patent: Dec. 31, 2024

(54) MAGNETIC DISK DEVICE AND METHOD OF CONTROLLING MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Takayuki Kawabe, Sagamihara Kanagawa (JP); Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/419,989

(22) Filed: Jan. 23, 2024

(30) Foreign Application Priority Data

Aug. 21, 2023 (JP) ................. 2023-134006

(51) Int. Cl.
  *G11B 5/54* (2006.01)
  *G11B 5/596* (2006.01)

(52) U.S. Cl.
  CPC ................. *G11B 5/59627* (2013.01)

(58) Field of Classification Search
  CPC ....... G11B 5/012; G11B 21/106; G11B 5/596; G11B 5/59627; G11B 5/09; G11B 19/04; G11B 15/04; G11B 5/58; G11B 5/59655; G11B 2220/20; G11B 2220/90; G11B 27/3027; G11B 27/36

USPC .......................................... 360/75
  See application file for complete search history.

(56) References Cited

U.S. PATENT DOCUMENTS

| | | | |
|---|---|---|---|
| 7,245,447 B2 | 7/2007 | Zaitsu | |
| 8,587,889 B2 | 11/2013 | Kawabe | |
| 8,885,284 B2 | 11/2014 | Kashiwagi et al. | |
| 9,026,728 B1 | 5/2015 | Xi et al. | |
| 9,424,870 B2 | 8/2016 | Lee et al. | |
| 9,892,749 B2 | 2/2018 | Qiang et al. | |
| 10,192,570 B2 | 1/2019 | Kawabe et al. | |
| 11,373,684 B2 | 6/2022 | Kubota et al. | |
| 11,562,767 B1 * | 1/2023 | Patapoutian | G11B 5/59655 |
| 2023/0282228 A1 | 9/2023 | Kawabe et al. | |

FOREIGN PATENT DOCUMENTS

JP 2023-127528 A 9/2023

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a magnetic disk, a magnetic head, and a controller including an offtrack write table, positioning the magnetic head, and registering an address at which data in a track is written and a positioning error of the magnetic head at the address for the track, in the offtrack write table. When writing data to a first sector, the controller corrects a positioning target position of the first sector, based on a positioning error of a second sector located on two tracks away in a radial direction from the first sector.

9 Claims, 13 Drawing Sheets

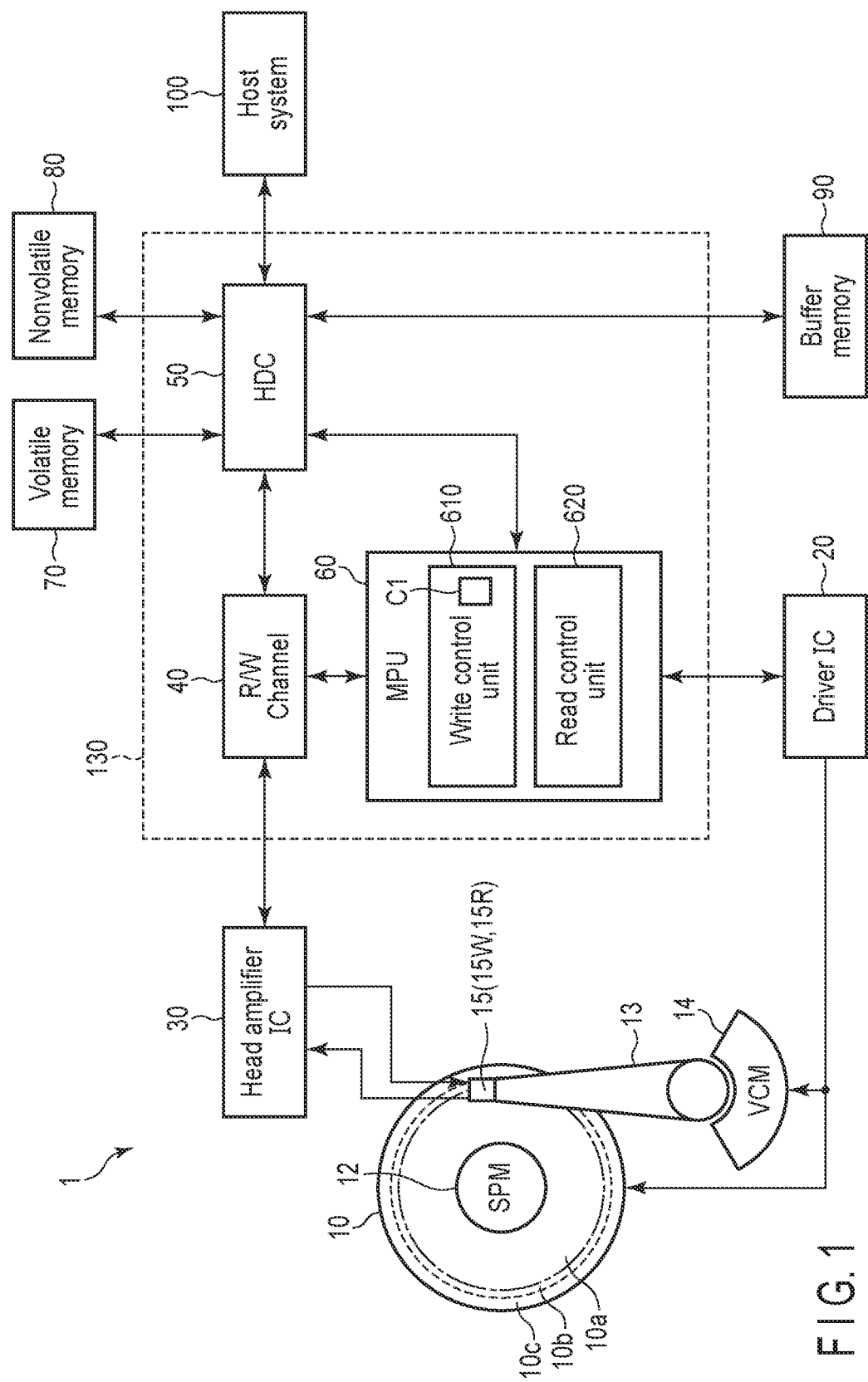
F I G. 1

MAGNETIC DISK DEVICE AND METHOD OF CONTROLLING MAGNETIC DISK DEVICE

CROSS-REFERENCE TO RELATED APPLICATIONS

This application is based upon and claims the benefit of priority from Japanese Patent Application No. 2023-134006, filed Aug. 21, 2023, the entire contents of which are incorporated herein by reference.

FIELD

Embodiments described herein relate generally to a magnetic disk device and a method of the magnetic disk device.

BACKGROUND

A magnetic disk device is equipped with a magnetic disk, a magnetic head that writes data to or reads data from the magnetic disk, a system controller, and the like.

The system controller performs positioning control of the magnetic head to a plurality of tracks formed in substantially concentric circles on the magnetic disk (hereinafter also referred to as "positioning"). The magnetic heads are positioned to be offtrack in the radial direction of the magnetic disk relative to the tracks due to a positioning control error. If an offtrack amount is large, the risk of erasing data recorded on adjacent tracks increases. If write is stopped with a small offtrack amount to avoid the data erasure, write performance is degraded.

BRIEF DESCRIPTION OF THE DRAWINGS

FIG. 1 is a block diagram showing a configuration of a magnetic disk device according to a first embodiment.

DETAILED DESCRIPTION

Figure 2:
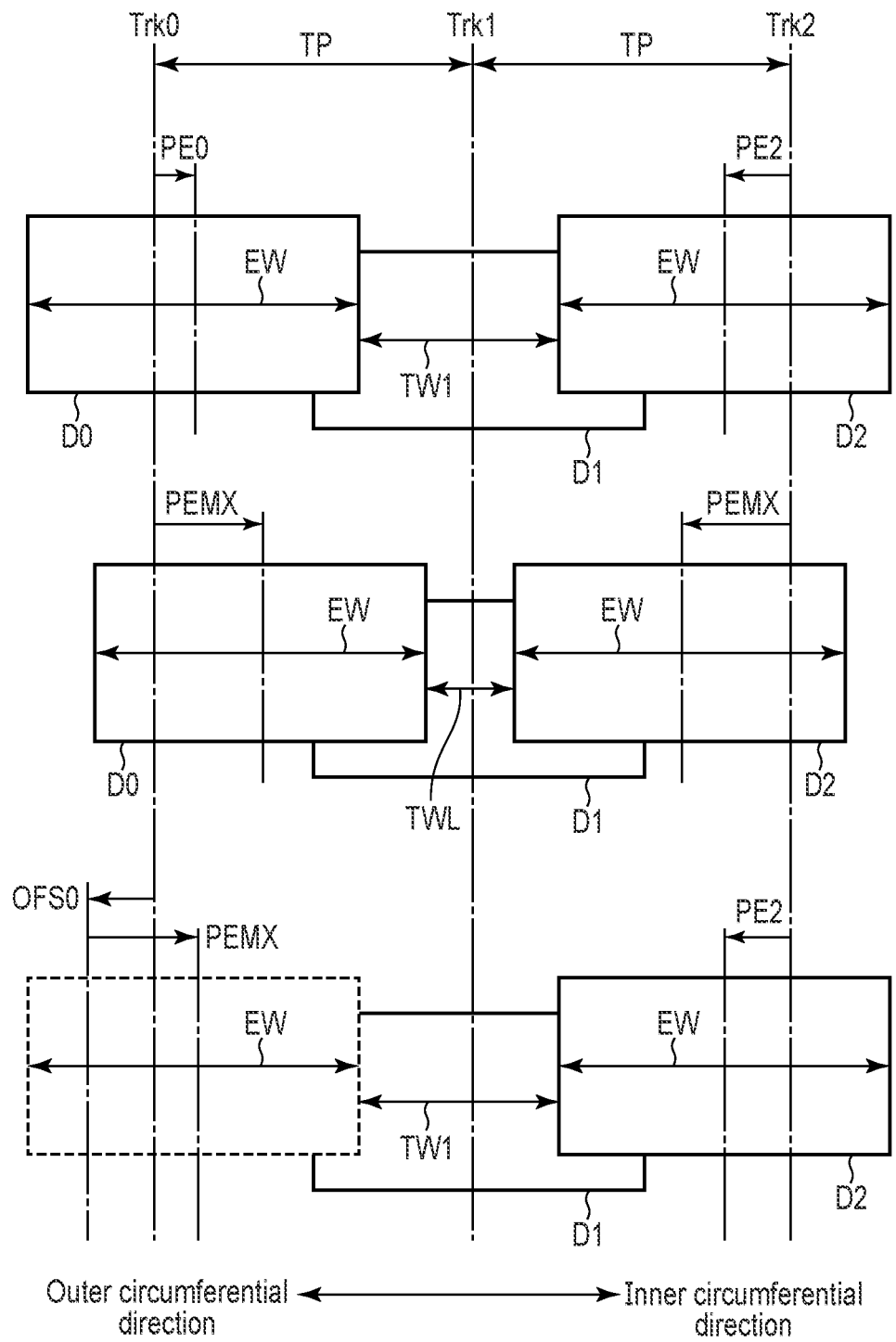
FIG. 2 is a view showing an example of a write process of the magnetic disk device according to the first embodiment.

In general, according to one embodiment, there is provided a magnetic disk device comprising: a magnetic disk; a magnetic head positioned in a track provided at a predetermined track pitch of the magnetic disk, writing data to the track, and reading data from the track; and a controller including an offtrack write table, positioning the magnetic head, and registering an address at which data in the track is written and a positioning error of the magnetic head at the address for the track, in the offtrack write table. When writing data to a first sector, the controller corrects a positioning target position of the first sector, based on a positioning error of a second sector located in two tracks away in a radial direction from the first sector.

According to another embodiment, there is provided a method of controlling a magnetic disk device comprising a magnetic disk, a magnetic head positioned in a track provided at a predetermined track pitch of the magnetic disk to write data to the track and read data from the track, and an offtrack write table. The method comprises positioning the magnetic head, registering an address at which data in the track is written and a positioning error of the magnetic head at the address for the track, in the offtrack write table, and when writing data to a first sector, correcting a positioning target position of the first sector, based on a positioning error of a second sector located in two tracks away in a radial direction from the first sector.

Embodiments will be described hereinafter with reference to the accompanying drawings. The drawings are merely examples and do not limit the scope of the invention.

FIG. 1 is a block diagram showing a configuration of a magnetic disk device 1 according to a first embodiment.

As shown in FIG. 1, the magnetic disk device 1 comprises a head-disk assembly (HDA) to be described later, a driver IC 20, a head amplifier integrated circuit (hereinafter referred to as a head amplifier IC or a preamplifier) 30, a volatile memory 70, a nonvolatile memory 80, a buffer memory 90, and a system controller 130 that is a single-chip integrated circuit. In addition, the magnetic disk device 1 is connected to a host system (host) 100.

The HDA includes a magnetic disk (hereinafter referred to as a disk) 10, a spindle motor (SPM) 12, an arm 13 on which a magnetic head 15 is mounted, and a voice coil motor (VCM) 14. The disk 10 is attached to the spindle motor 12 to rotate by driving the spindle motor 12. The arm 13 and the voice coil motor 14 constitute an actuator. The actuator controls the movement of the magnetic head 15 mounted on the arm 13 to a predetermined position on the disk 10 by driving the voice coil motor 14. Two or more disks 10 and magnetic heads 15 may be provided.

In the following descriptions, data to be written to each unit of the magnetic disk device 1 and an external device, for example, the disk 10 may be referred to as write data, and the data to be read from each unit of the magnetic disk device 1 and an external device, for example, the disk 10 may be referred to as read data. The write data may be simply referred to as data, read data may be simply referred to as data, and write data and read data may be collectively referred to as data.

On the disk 10, a user data area 10a which can be used by the user, a media cache area 10b where data (or commands) transferred from the host 100 and the like are temporarily held before written to a predetermined area of the user data area 10a, and a system area 10c where information necessary for system management is recorded, are allocated as areas where the data can be written. The direction orthogonal to the radial direction of the disk 10 is hereinafter referred to as a circumferential direction. Incidentally, the media cache area 10b does not necessarily have to be allocated, and the system area 10c may be allocated to the nonvolatile memory 80 or the like.

The magnetic head (hereinafter referred to as a head) 15 comprises a slider serving as a main body, and a write head 15W and a read head 15R that are mounted on the slider. The write head 15W writes data to tracks of the disk 10. The read head 15R reads data recorded in the track on the disk 10.

Incidentally, the write head 15W may be simply referred to as the head 15, the read head 15R may be simply referred to as the head 15, and the write head 15W and the read head 15R may be collectively referred to as the head 15. The term "track" is used to mean one of a plurality of areas obtained by radially dividing the disk 10, one of a plurality of areas obtained by circumferentially dividing the disk 10, data written to a predetermined position on the disk 10, data written to a sector, and various other meanings. In addition, a radial width of the track is referred to as a track width, and a central position of the track width is referred to as a track center.

The driver IC 20 controls driving the spindle motor 12 and the VCM 14 under control of the system controller 130 (more specifically, MPU 60 to be described later).

The head amplifier IC (preamplifier) 30 comprises a read amplifier and a write driver. The read amplifier amplifies a read signal that is read from the disk 10 by the read head 15R, and outputs the amplified read signal to the system controller 130 (more specifically, a read/write (R/W) channel 40 to be described later). The write driver outputs a write current corresponding to the signal output from the R/W channel 40, to the write head 15W.

The volatile memory 70 is a semiconductor memory where the stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR or NAND flash read only memory (flash ROM; FROM).

The buffer memory 90 is a semiconductor memory that temporarily records data and the like transmitted and received between the magnetic disk device 1 and the host 100. Incidentally, the buffer memory 90 may be constituted integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is realized by using, for example, a large scale integrated circuit (LSI) referred to as a system-on-a-chip (SoC) in which a plurality of elements are integrated on a single chip. The system controller 130 includes a read/write (R/W) channel 40, a hard disk controller (HDC) 50, and a microprocessor (MPU) 60. The system controller 130 is electrically connected to the driver IC 20, the head amplifier IC 30, the volatile memory 70, the nonvolatile memory 80, the buffer memory 90, and the host 100.

The R/W channel 40 performs signal processing of read data transferred from the disk 10 to the host 100 and write data transferred from the host 100 in response to an instruction from the MPU 60 to be described later. The R/W channel 40 has a circuit or a function for measuring the signal quality of the read data. The R/W channel 40 is electrically connected to, for example, the head amplifier IC 30, the HDC 50, the MPU 60 and the like.

The HDC 50 controls data transfer between the host 100 and the R/W channel 40 in response to an instruction from the MPU 60 to be described later. The HDC 50 is electrically connected to, for example, the R/W channel 40, the MPU 60, the volatile memory 70, the nonvolatile memory 80, the buffer memory 90, and the like.

The MPU 60 is a main controller which controls each of units of the magnetic disk device 1. The MPU 60 controls the VCM 14 via the driver IC 20 and performs servo control for positioning the head 15. In addition, the MPU 60 controls the spindle motor (SPM) 12 via the driver IC 20 to rotate the disk 10. The MPU 60 controls the operation of writing the data to the disk 10 and selects a storage destination of the write data. In addition, the MPU 60 controls the operation of reading the data from the disk 10 and controls the processing of the read data. The MPU 60 is connected to each unit of the magnetic disk device 1. The MPU 60 is electrically connected to, for example, the driver IC 20, the R/W channel 40, the HDC 50 and the like.

The MPU 60 includes a write control unit 610 that controls write processing, a read control unit 620 that controls read processing, and the like. The MPU 60 performs the processing of these units, for example, the write control unit 610, the read control unit 620, and the like, on firmware. Incidentally, the MPU 60 may comprise these units, for example, the write control unit 610 and the read control unit 620 as circuits.

The write control unit 610 controls data write processing in accordance with commands from the host 100 or the like. The write control unit 610 controls the VCM 14 via the driver IC 20, arranges the head 15 at a predetermined position on the disk 10, and writes the data. In the following descriptions, "positioning the center of the head 15 (write head 15W or read head 15R) at a predetermined position" or "arranging the center of head 15 (write head 15W or read head 15R) at a predetermined position" may also be simply referred to as "positioning the head 15 (write head 15W or read head 15R) at a predetermined position" or "arranging the head 15 (write head 15W or read head 15R) at a predetermined position". In addition, "positioning the head 15 (write head 15W or read head 15R) at a predetermined position" or "arranging the head 15 (write head 15W or read head 15R) at a predetermined position" may also be simply referred to as "positioning" or "arranging".

The write control unit 610 writes the data by arranging the head 15 (write head 15W) at a position which is a target of the write process (hereinafter often referred to as a positioning target position, a target position, or a target write position). The write control unit 610 arranges the head 15 at the target write position and writes randomly. In other words, the write control unit 610 randomly writes the data by arranging the head 15 at a predetermined circumferential position, i.e., a radial position which is a target of the write process (hereinafter often referred to as the target radial position or target write radial position). For example, the write control unit 610 randomly writes a predetermined sector by controlling the head 15 to be arranged at a predetermined circumferential position, i.e., a target write radial position.

The write control unit 610 can randomly write the data to a predetermined position (hereinafter often referred to as an actual position or actual write position) by controlling the head 15 to be arranged at the target write position. The actual write position may be the target write position or a position displaced from the target write position.

In the following descriptions, "the center of the write head 15W is radially displaced from the predetermined target write position" may be described as "the write head 15W is offtrack from the predetermined track".

In addition, the write control unit 610 includes a write processing circuit C1, which will be described later with reference to FIG. 4. Incidentally, the write processing circuit C1 may be provided outside the write control unit 610.

The read control unit 620 controls data read processing according to commands from the host 100 or the like. The read control unit 620 controls the VCM 14 via the driver IC 20, arranges the head 15 at a predetermined position on the disk 10, and reads the data. The read control unit 620 may read data randomly or sequentially.

The read control unit 620 reads the data by arranging the head 15 (read head 15R) at the target read position. The read control unit 620 reads the data by arranging the head 15 at the target read position. In other words, the read control unit 620 controls the head 15 to be arranged at the target read radial position at a predetermined circumferential position and reads the data. For example, the read control unit 620 controls the head 15 to be arranged at the target read radial position at a predetermined circumferential position and reads a predetermined sector. Incidentally, the read control unit 620 may control the head 15 along a target read passage and read a predetermined track.

A basic concept of the embodiment will be described.

The head (magnetic recording and reproducing head) 15 of the magnetic disk device 1 has its radial position controlled by an actuator including the VCM 14 or the like so as to stay on the track formed in the circumferential direction of the magnetic disk 10. The above control is also referred to as positioning control in the following descriptions.

When external vibrations or shocks are applied to the magnetic disk device 1 incorporating the actuator including the head and the magnetic disk 10, the head 15 may write at an actual position displaced from the target position. To prevent the occurrence of the above displacement, the magnetic disk device 1 performs the positioning control of the head 15 by a feedback loop. In the following descriptions, "displacement between the target position and the actual position" is also referred to as "positioning error".

When the positioning error caused by the positioning control is large, the risk of erasing the data recorded on adjacent tracks increases, and the disk device therefore has a function of setting a threshold value (write offtrack slice; WOS) to the positioning error and, if the positioning error exceeds this, stopping the write operation, and preventing erasure of the data recorded on adjacent tracks. In the following descriptions, the above threshold value is also referred to as "write offtrack slice", "write offtrack threshold value", or "offtrack slice".

The write process will be described below with reference to the drawings.

FIG. 2 is a view showing an example of the write process of the magnetic disk device 1 according to the first embodiment. FIG. 2 shows three sequential tracks, which are aligned in the order of track Trk0, track Trk1, and track Trk2 from the outer circumferential direction along the radial direction of the disk 10. In upper, middle, and lower parts shown in FIG. 2, data is written in the order of track Trk1, track Trk2, and track Trk0, respectively.

As shown in the upper part of FIG. 2, each data area of the data written to track Trk0 and track Trk2 has an erase width EW. A data area D2 of the data written to track Trk2 is shifted (offset) toward track Trk1 such that the data is written to the data area. More specifically, the data area D2 is located to be offset by an error (positioning error, offset amount, or offtrack amount) PE2 toward the outer circumferential direction. A data area DO of the data written to track Trk0 is offset toward track Trk1 such that the data is written to the data area. More specifically, the data area DO is located to be offset by an error PE0 toward the inner circumferential direction.

Since the data sectors on tracks Trk0 and Trk2 are offset by the errors PE0 and PE2 as described above such that the data is written to the sectors, the track width of the data area D1 of the data written to track Trk1 is the track width TW1 from the inner circumferential edge of the data area DO to the outer circumferential edge of the data area D2. In this case, when the inner circumferential direction is positive, the track width TW1 is expressed by the following expression (1). TW1 is the track width, TP is the track pitch, EW is the erase width, PE0 is the error in the data area DO, and PE2 is the error in the data area D2.

$$TW1=2TP-EW-(PE0-PE2) \quad (1)$$

Next, a case in which the errors PE0 and PE2 in the data areas DO and D2 are the upper limit values PEMX, as shown in the middle part of FIG. 2, will be described.

The upper limit values PEMX are the upper limit of the absolute values of the errors PE0 and PE2. At this time, when the track width TW1 is set as a lower limit value TWL at which the user data can be read normally, the lower limit value TWL is expressed by the following expression. TWL represents the lower limit value and PEMX represents the upper limit value.

$$TWL=2TP-EW-2PEMX$$

It is defined based on the above expression that TPI margin value TM is twice the upper limit value PEMX. The TPI margin value TM is an amount of track squeeze for which the read error rate is allowed. The TPI margin value TM is expressed by the following expression (2). TM represents the TPI margin value.

$$TM=2PEMX=2TP-EW-TWL \quad (2)$$

Based on the above expressions (1) and (2), the track width TW1 is expressed by the following expression (3).

$$TW1=TWL+TM-(PE0-PE2) \quad (3)$$

It can be understood from expression (3) that the track width TW1 is determined based on the lower limit TWL, the TPI margin value TM, and the positioning errors PE0 and PE2 of adjacent data. Furthermore, when the value obtained by subtracting the positioning error PE2 from the positioning error PE0 is smaller than or equal to the TPI margin value TM, it can be understood that the track width TW1 is greater than or equal to the lower limit value TWL. In other words, when the difference between the positioning error PE0 and the positioning error PE2 is smaller than or equal to the TPI margin value TM, the user data written to track Trk1 is preserved.

Next, a case of offsetting the target position for writing the data to track Trk0 by a correction amount OFS0 when the positioning error PE2 is known, as shown in the lower part of FIG. 2, will be described.

A relationship among the positioning error PE0, the correction amount OFS0, and the upper limit value PEMX can be expressed by the following expression.

$$PE0 \leq OFS0+PEMX$$

Based on the above expression, the expression (2), and the expression (3), the track width TW1 is expressed by the following expression.

$$TW1 \geq TWL+PEMX+(PE2-OFS0)$$

Therefore, when the correction amount OFS0 is equal to the positioning error PE2, the track width TW1 is expressed by the following expression (4).

$$TW1 \geq TWL+PEMX \quad (4)$$

The expression (4) indicates that when the correction amount OFS0 is equal to the positioning error PE2, the track width TW1 is wider than the lower limit value TWL, which is the read limit, by the maximum positioning error (upper limit value) PEMX. In this method, however, protection of the data written to track Trkm1 (see FIG. 3), which is adjacent to the outer circumferential side of track Trk0 is not considered.

A process for protecting both adjacent tracks Trk1 and Trkm1 will be described below.

Figure 3:
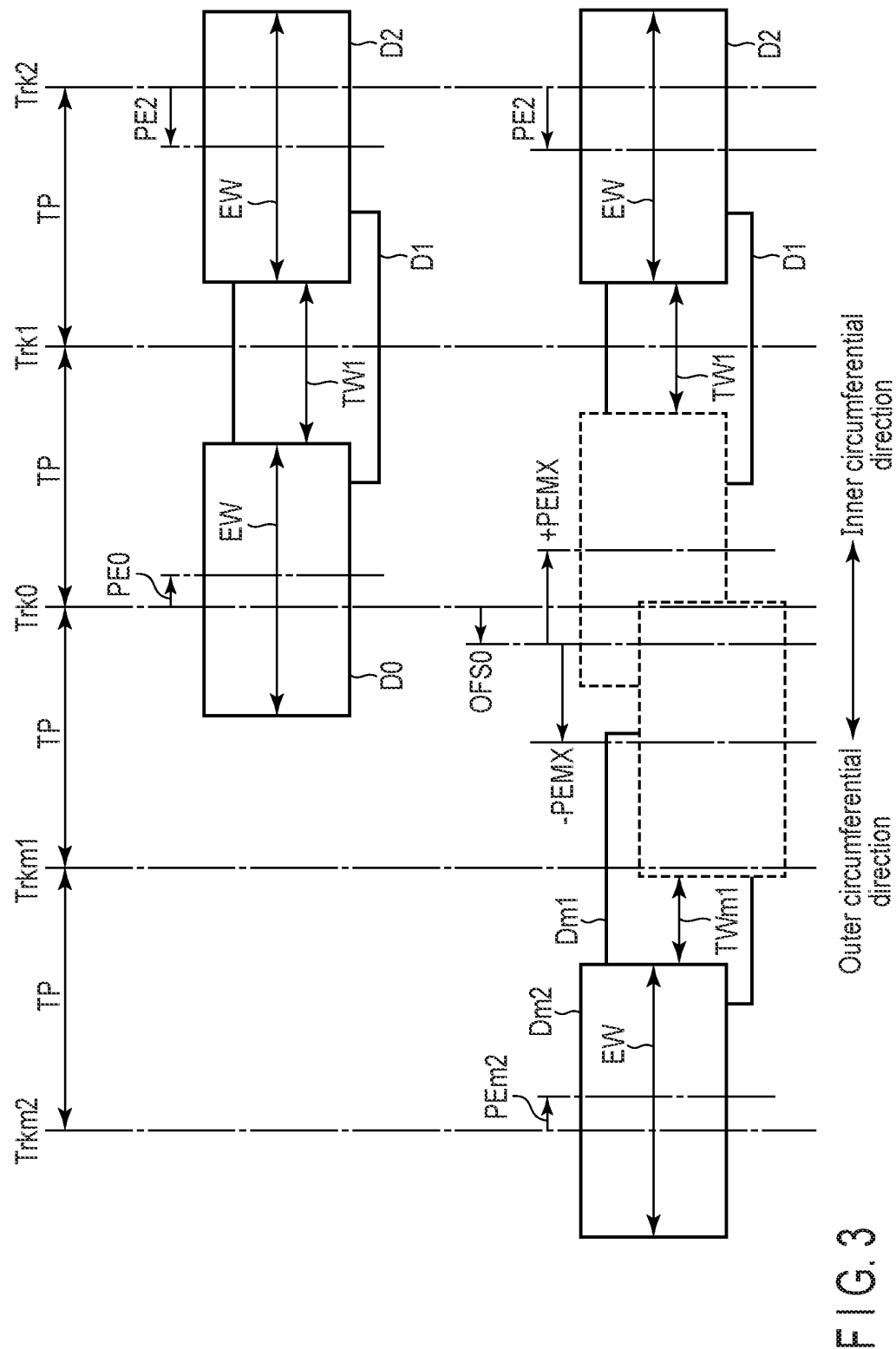
FIG. 3 is a view showing an example of a write process of the magnetic disk device according to the first embodiment.

FIG. 3 is a view showing an example of the write process of the magnetic disk device 1 according to the first embodiment. In the lower part of FIG. 3, two tracks Trkm2 and Trkm1 are shown in addition to three tracks Trk0, Trk1, and Trk2 in the upper part, and the data is written to track Trk1, track Trk2, track Trkm1, and track Trkm2 in the order.

As shown in the lower part of FIG. 3, the data area D2 of track Trk2 is offset toward the outer circumferential direction by the error PE2 such that the data is written to the data area, and a data area Dm2 of track Trkm2 is offset toward the inner circumferential direction by an error PEm2 such that the data is written to the data area. The data is written to track Trk0 while the target position is offset by the correction amount OFS0.

A possible range of the error PE0 in writing the data to track Trk0 is expressed by the following expression (5).

$$OFS0-PEMX \leq PE0 \leq OFS0+PEMX \quad (5)$$

At this time, the lower limit value of the track width TW1 of the data area D1 and the lower limit value of the track width TWm1 of the data area Dm1 are expressed by the following expressions (6a) and (6b), respectively. TWm1 is the track width of the data area Dm1.

$$TW1 \geq TWL+PEMX-(OFS0-PE2) \quad (6a)$$

$$TWm1 \geq TWL+PEMX+(OFS0-PEm2) \quad (6b)$$

The correction amount of the target position by which the lower limit value of the track width TW1 and the lower limit value of the track width TWm1 are balanced is expressed by the following expression (7) by making the right side of the expression (6a) equal to the right side of the expression (6b).

$$OFS0=(PE2+PEm2)/2 \quad (7)$$

In other words, the correction amount OFS0 is half of the value obtained by adding the positioning error PEm2 of the sector on two tracks outside from the target sector to the positioning error PE2 of the sector on two tracks inside from the target sector.

In the following descriptions, "positioning error" may be described as "error position", and "correction amount" may be described as "target position".

Based on the above, by considering the positioning error (in one example, error PE2) of the data written to the track which is located on two tracks inside (in one example, track Trk2) and the positioning error (in one example, error PEm2) of the data written to the track which is located on two tracks outside (in one example, track Trkm2), existing data on the tracks (in one example, tracks Trk1 and Trkm1) on both sides of a write target track (in one example, track Trk0) can be protected under the same conditions. Narrowing either of the track widths and degrading the preservation of user data can be thereby suppressed.

Next, a control configuration for calculating the target position will be described.

Figure 4:
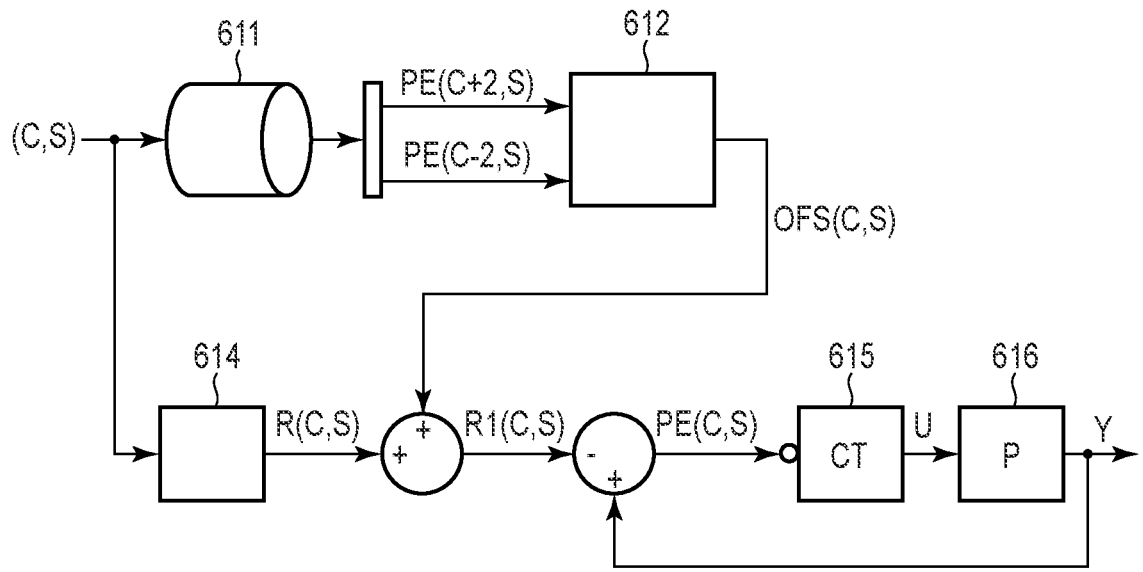
FIG. 4 is a block diagram showing an example of a control configuration of the magnetic disk device according to the first embodiment.

FIG. 4 is a block diagram showing an example of the control configuration of the magnetic disk device 1 according to the first embodiment, illustrating the write processing circuit C1 of the write control unit 610 in FIG. 1. In FIG. 4, a head number is omitted, and a cylinder number C and a sector number S are only expressed in addresses of target sectors (C, S). The cylinder number C is the number consecutively assigned in the direction from the outer circumference to the inner circumference or from the outer circumference to the inner circumference with respect to the track on the disk 10, and may be referred to as a track number.

As shown in FIG. 4, the write processing circuit C1 of the write control unit 610 includes an offtrack write table 611, a target position trajectory generation circuit 612, a physical target transducer 614, a controller 615, and an actuator 616.

The target sector (C, S) is converted into a physical target position R (C, S), which is the radial position of the disk 10, by the physical target transducer 614. The physical target position R (C, S) becomes a target position R1(C, S) corrected by adding the correction amount OFS(C, S) of the target position. A difference between a physical position Y of the magnetic head 15 and the corrected target position R1 becomes a positioning error PE (C, S) in the sector (C, S). The positioning error PE is negatively fed back and input to the controller 615 and output to the actuator 616 as a control amount U. The actuator 616 uses the control amount U as an input and outputs a physical position Y of the magnetic head 15, which is the radial position of disk 10.

In addition, the offtrack write table 611 is referenced, and the positioning error PE (C+2, S) of the data area of the data written to the sector (C+2, S) located in two tracks inside, and the positioning error PE (C−2, S) of the data area of the data written to the sector (C−2, S) located in two tracks outside are output from the address of the target sector (C, S). The positioning error PE (C+2, S) and the positioning error PE (C−2, S) are input to the target position trajectory generation circuit 612, which outputs a correction amount OFS(C, S) for the target position according to the input.

As the correction amount OFS(C, S), for example, the following expression (8) can be obtained according to expression (7).

$$OFS(C,S)=(PE(C+2,S)+PE(C-2,S))/2 \quad (8)$$

Next, a mechanism for registering the positioning error in the offtrack write table 611 will be described.

Figure 5:
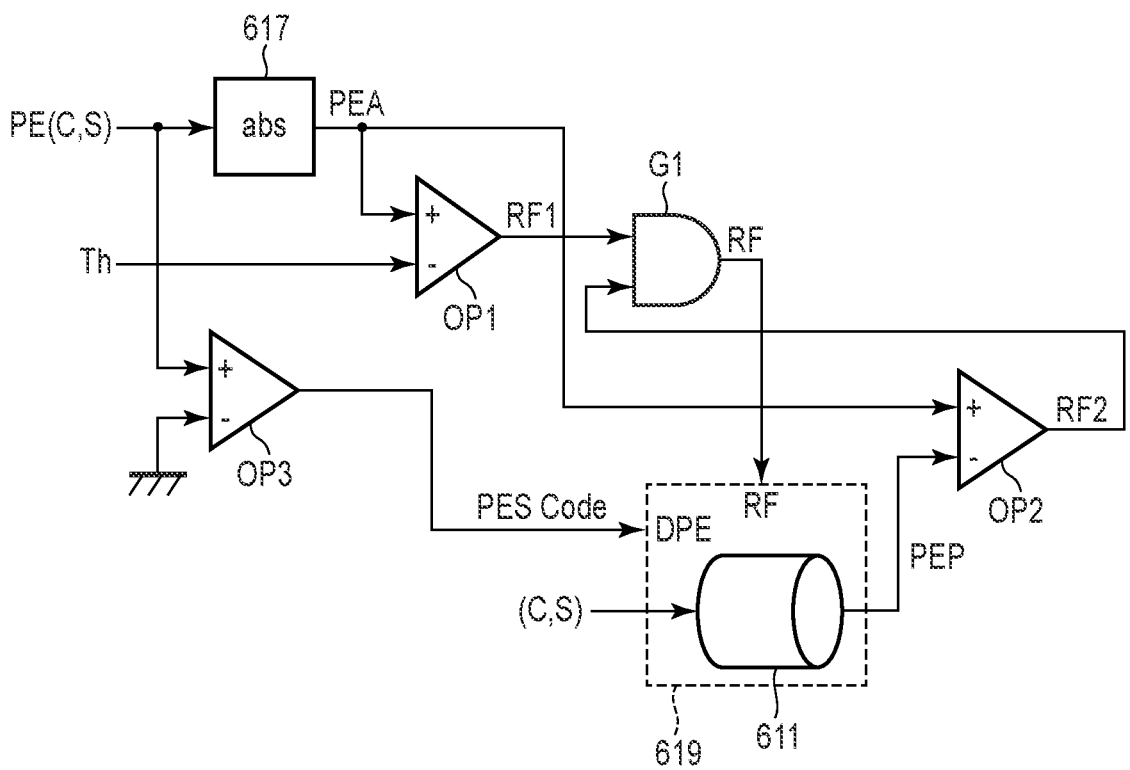
FIG. 5 is a diagram showing an example of a control configuration of the magnetic disk device according to the first embodiment.

FIG. 5 is a diagram showing an example of a control configuration of the magnetic disk device 1 according to the first embodiment. FIG. 5 shows the configuration for registering and updating the positioning error in the offtrack write table 611.

As shown in FIG. 5, the positioning error PE (C, S) at the time of writing to the target sector (C, S) is input to an absolute value circuit 617 and output as an absolute value PEA of the positioning error PE (C, S).

The absolute value PEA is compared with a predetermined registration determination threshold value Th in an operational amplifier OP1. The operational amplifier OP1 outputs a registration flag RF1 as 1 when the absolute value PEA exceeds the registration determination threshold value Th, or outputs the registration flag RF1 as 0 when the absolute value PEA does not exceed the registration determination threshold value Th.

In contrast, an offtrack write table reference update block (hereinafter also referred to as an OWT reference update block) 619 outputs the previous maximum positioning error PEP in the target direction for the target address (in one example, sector (C, S)). The target direction means the same direction as the positioning error PE (C, S).

An operational amplifier OP2 compares the previous maximum positioning error PEP with the absolute value PEA of the current positioning error PE (C, S), and outputs the update flag RF2 as 1 when the absolute value PEA exceeds the maximum positioning error PEP or outputs the update flag RF2 as 0 when the absolute value PEA does not exceed the maximum positioning error PEP.

If there is no positioning error in the sector (C, S) in the OWT reference update block 619, the maximum positioning error PEP is output as 0, and the operational amplifier OP2 thereby outputs the update flag RF2 as 1.

An operational amplifier OP3 outputs flag DPE as 1 when the positioning error PE (C, S) is smaller than 0, or outputs the flag DPE as 0 when the positioning error PE (C, S) is not smaller than 0. In other words, the operational amplifier can identify a sign of the positioning error PE (C, S) by the flag DPE.

When the registration flag RF1 is output as 1 and the update flag RF2 is output as 1, an AND gate G1 outputs the update registration flag RF as 1. When the update registration flag RF is output as 1, the information is updated or newly registered in the offtrack write table 611 according to the sign of the positioning error PE (C, S).

Next, the correction amount OFS for the target position calculated by the target position trajectory generation circuit 612 will be described in detail.

Figure 6:
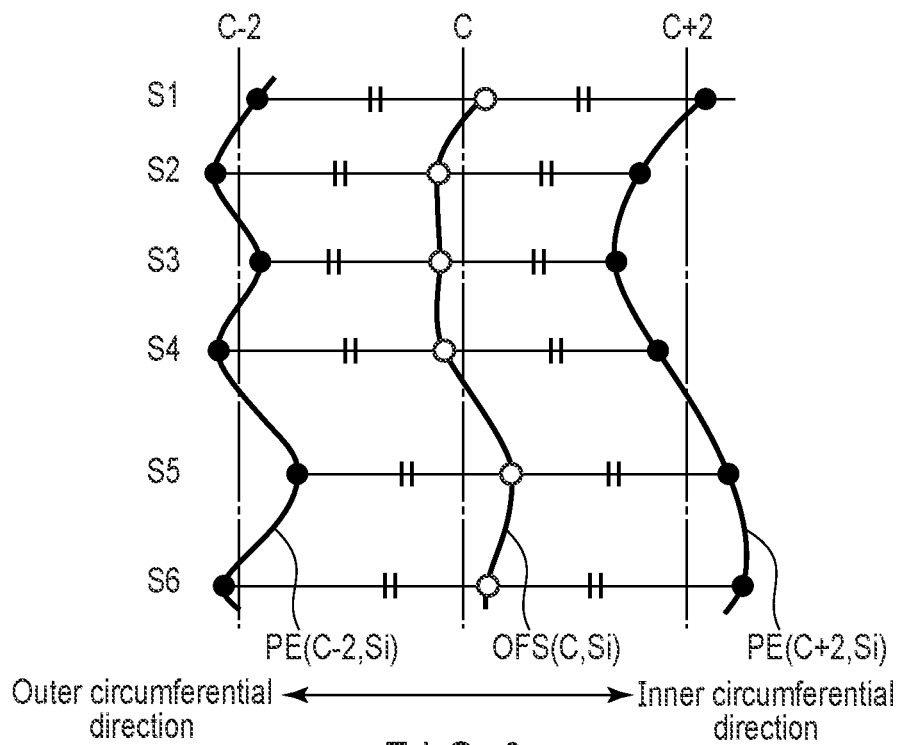
FIG. 6 is a schematic diagram showing a correction amount of target position and a positioning error of data written to sectors on two tracks away from a target sector.

FIG. 6 is a schematic diagram showing the correction amount OFS of the target position, and the positioning error PE of the data written to the sectors on two tracks away from a target sector. FIG. 6 is a diagram illustrating the operation of the target position trajectory generation circuit 612.

As shown in FIG. 6, the data of the positioning error PE (C−2, Si) is written to the sector (C−2, Si) located in two tracks outside from the target sector (C, Si) (i=1, 2, . . . , 6), and the data of the positioning error PE (C+2, Si) is written to the sector (C+2, Si) located in two tracks inside from the target sector (C, Si).

The positioning error PE (C−2, Si) and the positioning error PE (C+2, Si) can be referenced from the offtrack write table 611 and are indicated by black circles in the example shown in FIG. 6.

The correction amount OFS(C, Si) for the target position of the target sector (C, Si) is the target position correction amount calculated based on the information of the positioning error PE (C−2, Si) and the positioning error PE (C+2, Si) in the offtrack write table 611. In the example shown in FIG. 6, the correction amount OFS(C, Si) is indicated by a white circle. In one example, the correction amount OFS(C, Si) of the target position is the midpoint between the positioning error PE (C−2, Si) and the positioning error PE (C+2, Si) and is generated for each sector.

Since the correction amount OFS(C, Si) of the target position is generated as described above, the user data on the sector (C−1, Si) and sector (C+1, Si) (not shown) on the tracks indicated by cylinder numbers C−1 and C+1, which are adjacent to the track indicated by cylinder number C, is preserved.

In the example shown in FIG. 6, the case where the correction amount OFS(C, Si) is the midpoint between the positioning error PE (C−2, Si) and the positioning error PE (C+2, Si) has been described, but the correction amount is not limited to the midpoint. For example, when priority is given to making the target position trajectory along the track center, the positioning target position may be corrected between the correction amount OFS(C, Si) shown in FIG. 6 and the track center.

Incidentally, in the magnetic disk device 1 that performs random access, there are variations in the write state for two tracks away from the target track. For this reason, generating the target position using the midpoint between the positioning error of the data written to the sector on two tracks inside and the positioning error of the data written to the sector on two tracks outside may not be optimum for the purpose of protecting the data in the sectors adjacent to the target sector.

A case where the midpoint between the positioning errors of the data written to two tracks away is not used as the correction amount OFS of the target position will be described below.

Figure 7:
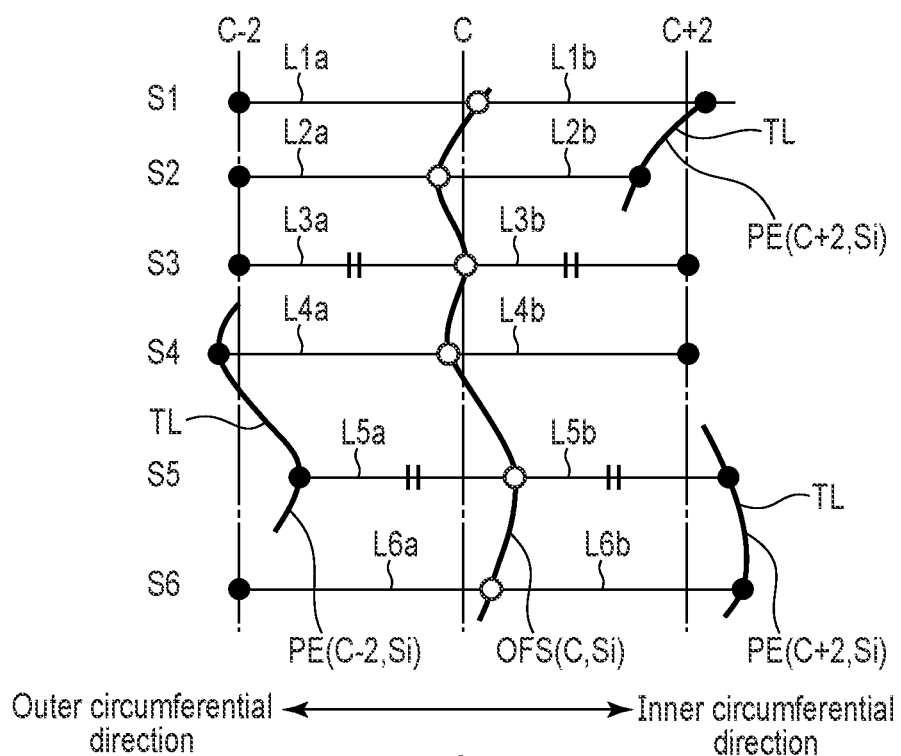
FIG. 7 is a schematic diagram showing a correction amount of target position and a positioning error of data written to sectors on two tracks away from a target sector.

FIG. 7 is a schematic diagram showing the correction amount OFS of the target position, and the positioning error PE of the data written to the sectors on two tracks away from a target sector.

As shown in FIG. 7, several sectors (C−2, S4) and (C−2, S5) on two tracks outside from the target sector (C, Si) and several sectors (C+2, S1), (C+2, S2), (C+2 S5), and (C+2, S6) on two tracks inside from the target sector (C, Si) are in the recorded (registered) state (active state), and the positioning errors PE (C−2, S4), PE (C−2, S5), PE (C+2, S1), PE (C+2, S2), PE (C+2, S5), and PE (C+2, S6) in the above sectors are represented by black circles on bold lines TL.

In the example shown in FIG. 7, sectors (C−2, S1), (C−2, S2), (C−2, S3), (C−2, S6), (C+2, S3), and (C+2, S4) are unrecorded (unregistered) sectors or sectors in which the data is written at (before) the time of the sectors (C−1, Si) and (C+1, Si) on one track away (not shown). For this reason, since the above sectors do not affect the sector (C−1, Si) or the sector (C+1, Si), the sectors are determined to be in an inactive state and the positioning error is considered to be zero.

When the sectors (C, S1), (C, S2), and (C, S6) are focused, the sectors (C−2, S1), (C−2, S2), and (C−2, S6) one two tracks outside are in the inactive state, and the sectors (C+2, S1), (C+2, S2), and (C+2, S6) on two tracks inside are in the active state. In other words, the sectors (C+1, S1), (C+1, S2), and (C+1, S6) (not shown) receive interference from the sectors (C+2, S1), (C+2, S2), and (C+2, S6), but the sectors (C−1, S1), (C−1, S2), and (C−1, S6) do not receive interference from the sectors (C−2, S1), (C−2, S2), and (C−2, S6).

At this time, the data written to the sectors (C+1, S1), (C+1, S2), and (C+1, S6) on the track adjacent to the inner circumferential side can be highly preserved by setting the correction amounts OFS(C, S1), OFS(C, S2), and OFS(C, S6) for the target position toward the outer circumferential side from the midpoint between the positioning errors PE (C−2, S1), PE (C−2, S2), and PE (C−2, S6) and the positioning errors PE (C+2, S1), PE (C+2, S2), and PE (C+2, S6).

In FIG. 7, for example, a ratio of the length of line segments L1b, L2b, and L6b to the length of line segments L1a, L2a, and L6a is greater than or equal to 1. In other words, the line segment L1b is greater than or equal to the line segment L1a, the line segment L2b is greater than or equal to the line segment L2a, and the line segment L6b is greater than or equal to the line segment L6a.

Next, when sector (C, S4) is focused, sector (C−2, S4) in the second track on the outer circumferential side is in the active state, and sector (C+2, S4) in the second track on the inner circumferential side is in the inactive state. In other words, sector (C−1, S4) (not shown) receives interference from the sector (C−2, S4), but sector (C+1, S4) (not shown) does not receive interference from the sector (C+2, S4).

At this time, the data of the sector (C−1, S4) on the track adjacent to the outer circumferential side can be highly preserved by setting the correction amount OFS(C, S4) for the target position toward the inner circumferential side from the midpoint between the positioning error PE (C−2, S4) and the positioning error PE (C+2, S4).

In FIG. 7, for example, a ratio of the length of line segment L4a to the length of line segment L4b is greater than or equal to 1.

In summary, the data of the sector adjacent to the target sector can be highly preserved by correcting the positioning target position of the target sector so as to be offset to the sector side which is determined inactive.

In addition, in the magnetic disk device 1 that performs random access, write positioning errors may become discontinuous on the same track. An example in which the positioning errors become discontinuous will be described below.

Figure 8:
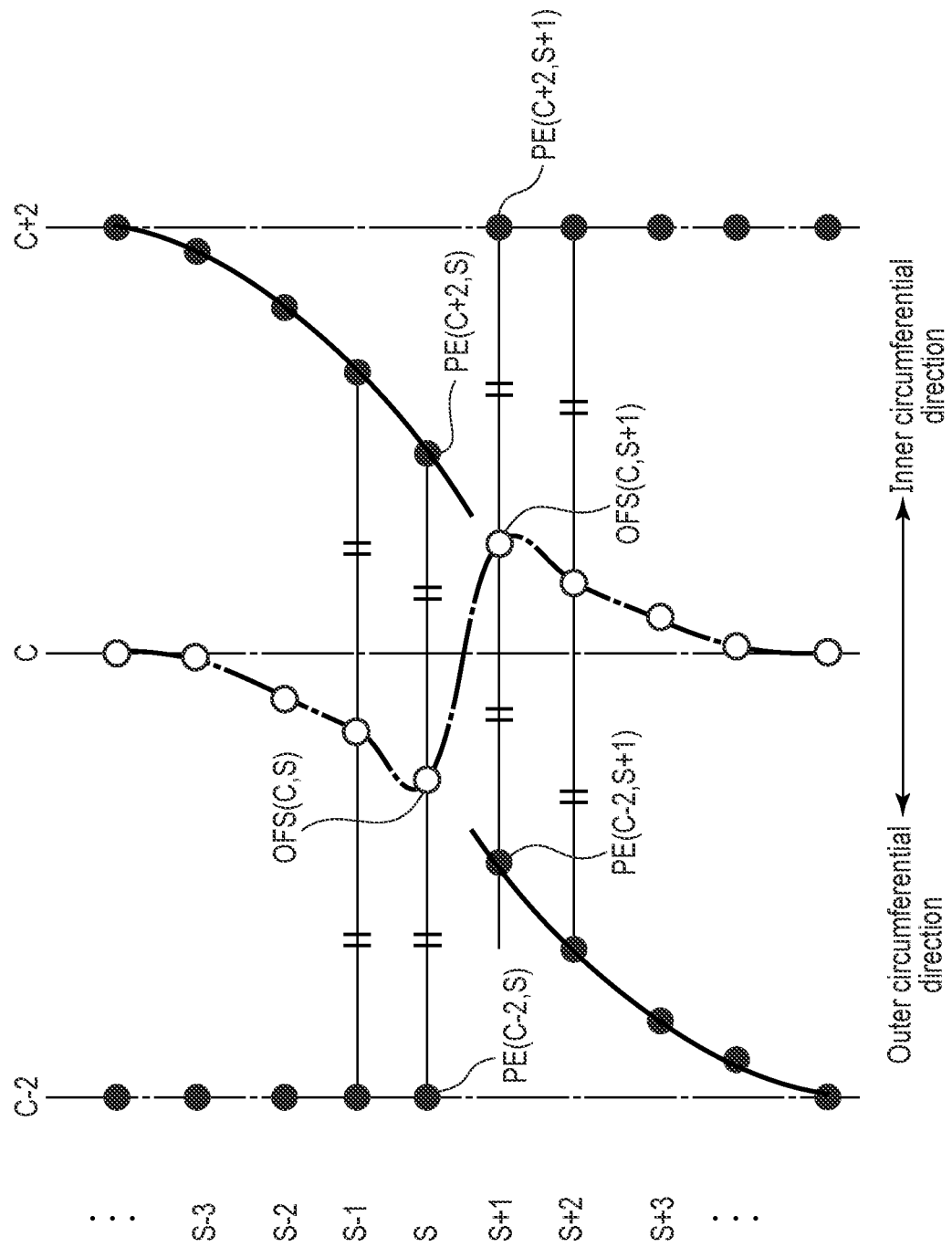
FIG. 8 is a schematic diagram showing a correction amount of target position and a positioning error of data written to sectors on two tracks away from a target sector.

FIG. 8 is a schematic diagram showing the correction amount OFS of the target position, and the positioning error PE of the data written to the sectors on two tracks away from a target sector.

As shown in FIG. 8, in sector (C−2, S+i) (i= . . . −2, −1, 0, 1, 2, . . . ), a discontinuous positioning error occurs between sector (C−2, S) and sector (C−2, S+1), and in sector (C+2, S+i), a discontinuous positioning error occurs between sector (C+2, S) and sector (C+2, S+1).

In such a case, discontinuity of the correction amount OFS(C, S) and the correction amount OFS(C, S+1) occurs between the target sector (C, S) and the target sector (C, S+1). Since the magnetic head 15 has a mass and the current that can flow to move the magnetic head 15 has an upper limit, the head positioning control system cannot accurately follow the target position trajectory as shown in FIG. 8, and may destroy the user data in the sectors (C−1, S+1) and (C+1, S+1) (not shown) on tracks adjacent to the target sector (C, S+1) in the radial direction.

A modified example of the first embodiment that can solve the above problem will be described with reference to FIG. 9.

Modified Example

Figure 9:
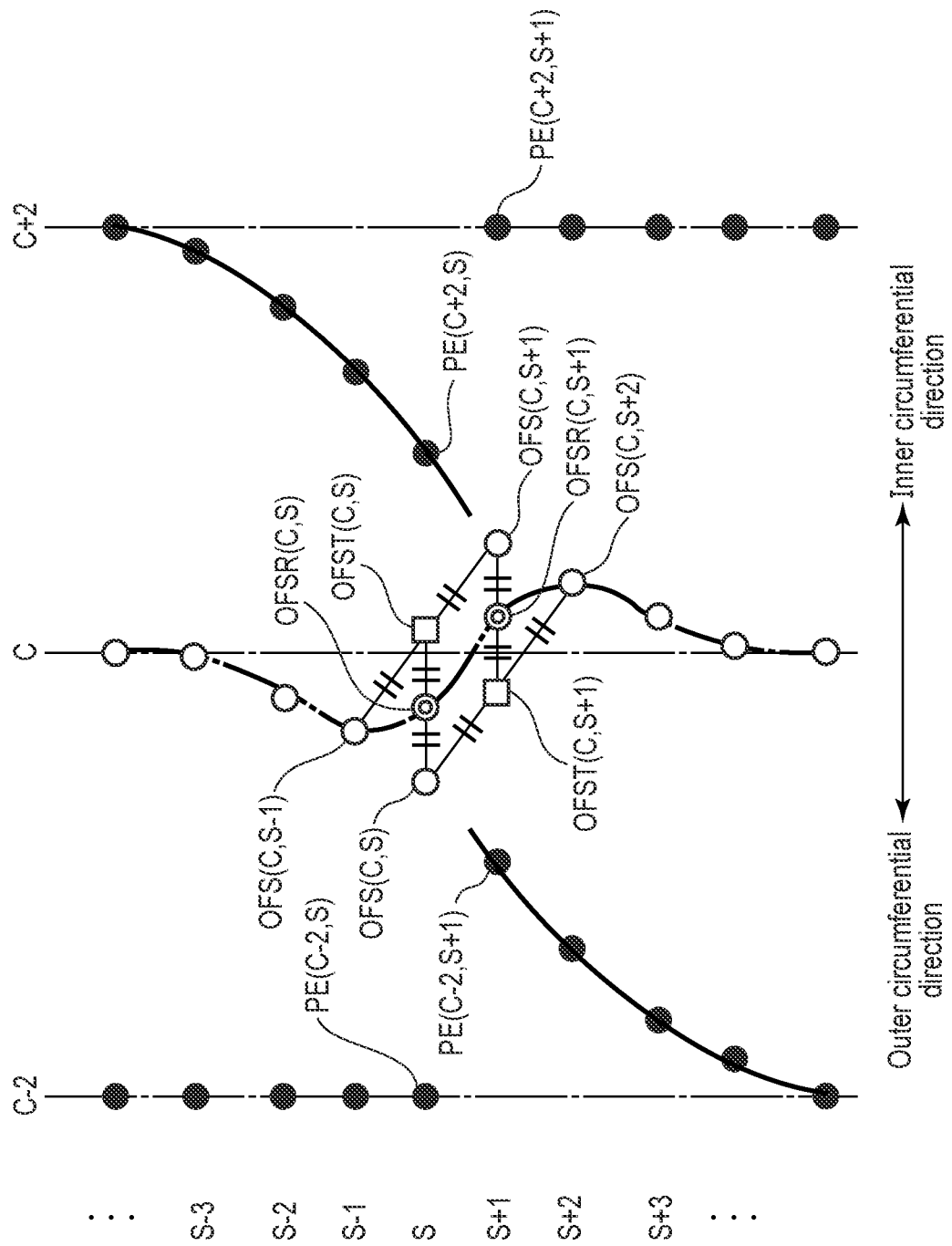
FIG. 9 is a schematic diagram showing a correction amount of target position and a positioning error of data written to sectors on two tracks away from a target sector.

FIG. 9 is a schematic diagram showing the correction amount OFS of the target position, and the positioning error PE of the data written to the sectors on two tracks away from a target sector.

In the description in the modified example, the correction amount OFS(C, S) of the target position in expression (8) is referred to as "initial target position correction amount value" or "initial correction amount value".

As shown in FIG. 9, first, an auxiliary offset amount OFST (C, S), which is the midpoint between the initial correction amount value OFS(C, S−1) of the sector (C, S−1) adjacent to the target sector (C, S) in the circumferential direction and the initial correction amount value OFS(C, S+1) of the sector (C, S+1), is obtained. The auxiliary offset amount OFST (C, S) is expressed by the following expression (9).

$$OFST(C,S)=(OFS(C,S-1)+OFS(C,S+1))/2 \qquad (9)$$

In other words, the auxiliary offset amount OFST (C, S) is half of the value obtained by adding the initial correction amount value OFS(C, S+1) to the initial correction amount value OFS(C, S−1).

Next, an optimum correction amount value OFSR(C, S) of the target position, which is the midpoint between the initial correction amount value OFS(C, S) and the auxiliary offset amount OFST (C, S) of the sector (C, S), is obtained. The optimum correction amount value OFSR(C, S) is expressed by the following expression (10).

$$OFSR(C,S)=(OFS(C,S)+OFST(C,S))/2 \qquad (10)$$

In one example, the optimum correction amount value OFSR(C, S) is half of the value obtained by adding the auxiliary offset amount OFST (C, S) to the initial correction amount value OFS(C, S).

The magnetic disk device 1 according to the modified example can correct the initial correction amount value OFS(C, S) to the optimum correction amount value OFSR (C, S) corresponding to the discontinuity by the above procedure.

In summary, the magnetic disk device 1 can calculate the initial correction amount values OFS(C, S−1) and OFS(C, S+1) of a pair of sectors (C, S−1) and (C, S+1) adjacent to the target sector (C, S) in the circumferential direction, calculate the auxiliary offset amount OFST (C, S), which is the midpoint between the initial correction amount values OFS(C, S−1) and OFS(C, S+1) of the pair of sectors (C, S−1) and (C, S+1), and calculate the optimum correction amount value OFSR(C, S), which is the midpoint between the initial correction amount value OFS(C, S) and the auxiliary offset amount OFST (C, S).

The correction amount OFSR is not limited to being the midpoint between the initial correction amount value OFS (C, S) and the auxiliary offset amount OFST (C, S), and may be, for example, between the above midpoint and the initial correction amount value OFS(C, S).

Similarly, the initial correction amount value OFS(C, S+1) can also be corrected to the optimum correction amount value OFSR(C, S+1).

By correcting the initial correction amount value OFS(C, S) to the optimum correction amount value OFSR(C, S) as described above, the correction amount for the optimum target position obtained by mitigating the discontinuity in the correction amount for the target position caused by the discontinuity in the positioning error of the data written to the sector on two tracks away, can be generated.

When expression (10) is substituted into expression (9), the optimum correction amount value OFSR(C, S) is expressed by the following expression (11).

$$OFSR(C,S)=OFS(C,S)/2+OFS(C,S-1)/4+OFS(C,S+1)/4 \qquad (11)$$

It can be understood from expression (11) that the optimum correction amount value OFSR(C, S) is a weighted moving average of the initial correction amount values OFS(C, S−1), OFS(C, S), and OFS(C, S+1) for three sequential sectors (C, S−1), (C, S), and (C, S+1). When this is generalized, the optimum correction amount value OFSR (C, S) is expressed by the following expression (12).

$$OFSR(C, S) = \sum_{i=-k}^{k} ai \times OFS(C, S+i), \sum_{i=-k}^{k} ai = 1 \quad (12)$$

In the example shown in one example, weight coefficient ai becomes smaller as a distance from the target sector (C, S) increases. In the example in expression (11), the weight coefficient is ½ when i=0, and ¼ when i=+1 or −1.

The optimum correction amount value OFSR may be calculated by calculating the initial correction amount values OFS for a plurality of sectors and linearly combining the plurality of initial correction amount values OFS using expression (12).

More specifically, the initial correction amount value OFS for sectors from the target sector to a predetermined number of previous sectors (one of the circumferential directions) and the initial correction amount value OFS for sectors from the target sector to a predetermined number of preceding sectors (the other of the circumferential directions) may be calculated, and a plurality of initial correction amount values OFS may be linearly combined using expression (12).

In FIG. 9, for example, the initial correction amount values OFS(C, S−2), OFS(C, S−1), OFS(C, S), OFS(C, S+1), and OFS(C, S+2) may be calculated for the respective sectors (C, S−2), (C, S−1), (C, S), (C, S+1), and (C, S+2), and the optimum correction amount value OFSR(C, S) may be calculated using expression (12).

Advantages of the first embodiment will be described.

According to the magnetic disk device 1 of the first embodiment, when writing data to the first sector (in one example, sector (C, S)), the magnetic disk device 1 corrects the positioning target position of the first sector, based on the positioning error of the second sectors (in one example, sectors (C−2, S) and (C+2, S)) located on two tracks away in the radial direction from the first sector. For this reason, it is possible to generate the dynamic positioning target position, based on the positioning error of the second sector, protect the data on tracks adjacent to the first sector, and level the offtrack slice excess rate. Therefore, the magnetic disk device 1 and a control method for the magnetic disk device 1, which is capable of preventing degradation in quality of adjacent tracks without degrading the write performance due to an increase in the frequency of write operation stops caused by detection of the offtrack slice excess, as described below, can be obtained.

By the way, the magnetic disk device 1 usually includes a write offtrack processing circuit, and stops the write operation when determining that the absolute value of the positioning error PE exceeds the write offtrack slice absolute value WOS before writing the data to the target sector.

However, since the positioning error PE is detected by the sampling process, the data may be written beyond the offtrack slice WOS. The sampling process will be described below with reference to FIG. 10.

Figure 10:
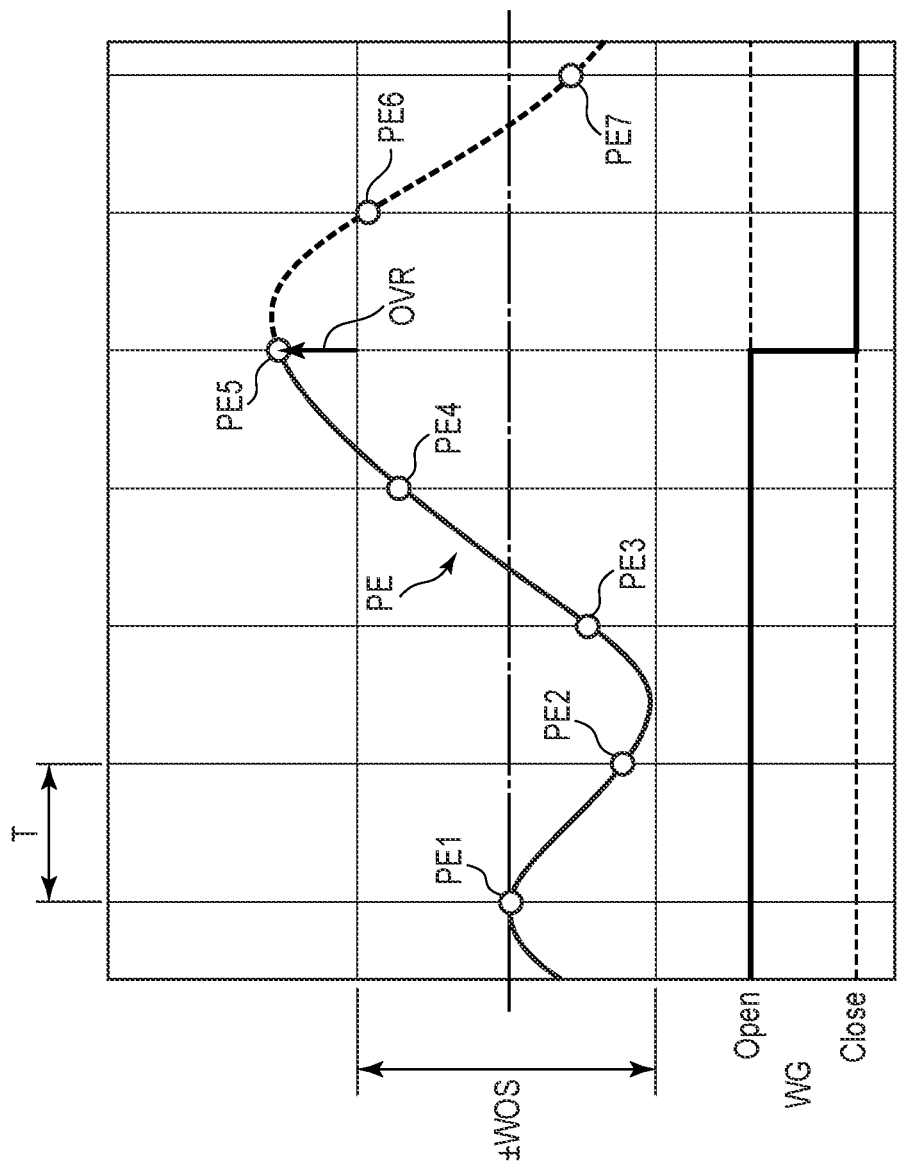
FIG. 10 is a schematic chart illustrating an example of a sampling process.

FIG. 10 is a schematic chart illustrating an example of a sampling process. FIG. 10 shows the open/close state of the write gate WG in addition to the trajectory of the positioning error PE of the magnetic head 15, which is represented by solid and broken curves. In addition, PE1, PE2, . . . , PE7 represented by white circles indicate the positioning errors PE detected intermittently by the sampling process.

As shown in FIG. 10, the magnetic disk device 1 detects the positioning errors PE at a predetermined time interval T by the sampling process. In the example shown in FIG. 10, the positioning errors PE1, PE2, PE3, and PE4 are located within the offtrack slices ±WOS, and the positioning error PE5 is located outside the offtrack slice ±WOS.

The magnetic disk device 1 (write control unit 610) closes the write gate WG after detecting the positioning error PE5. For this reason, the data of the positioning error PE5 that exceeds the offtrack slice #WOS is written to the sector.

In summary, when the positioning error PE is detected by the sampling process, a delay time from the time when the physical position of the magnetic head 15 exceeds the offtrack slice ±WOS until the time when the positioning error is detected, is made and the write operation continues. At this time, the amount of overflow from the offtrack slice ±WOS is referred to as an overrun amount OVR.

When an absolute value of the maximum value of the overrun amount OVR is referred to as an overrun maximum absolute value OVMX, the upper limit PEMX of the absolute value of the positioning error is a sum of the offtrack slice absolute value WOS and the overrun maximum absolute value OVMX and is expressed by expression (13). PEMX refers to the maximum value of the absolute value of the positioning error, WOS refers to the offtrack slice absolute value, and OVMX refers to the overrun maximum absolute value.

$$PEMX=WOS+OVMX \quad (13)$$

In addition, based on expression (2), the TPI margin value TM is expressed by the following expression (14).

$$TM=2(WOS+OVMX) \quad (14)$$

A magnetic disk device 1 according to a second embodiment in which a correction amount OFS of a target position is determined in consideration of an offtrack slice absolute value WOS will be described below. In the second embodiment described below, the same portions as those of the above-described first embodiment will be denoted by the same reference numbers, their detailed description will be omitted or simplified, and only portions different from the first embodiment will be mainly described in detail.

Second Embodiment

Figure 11:
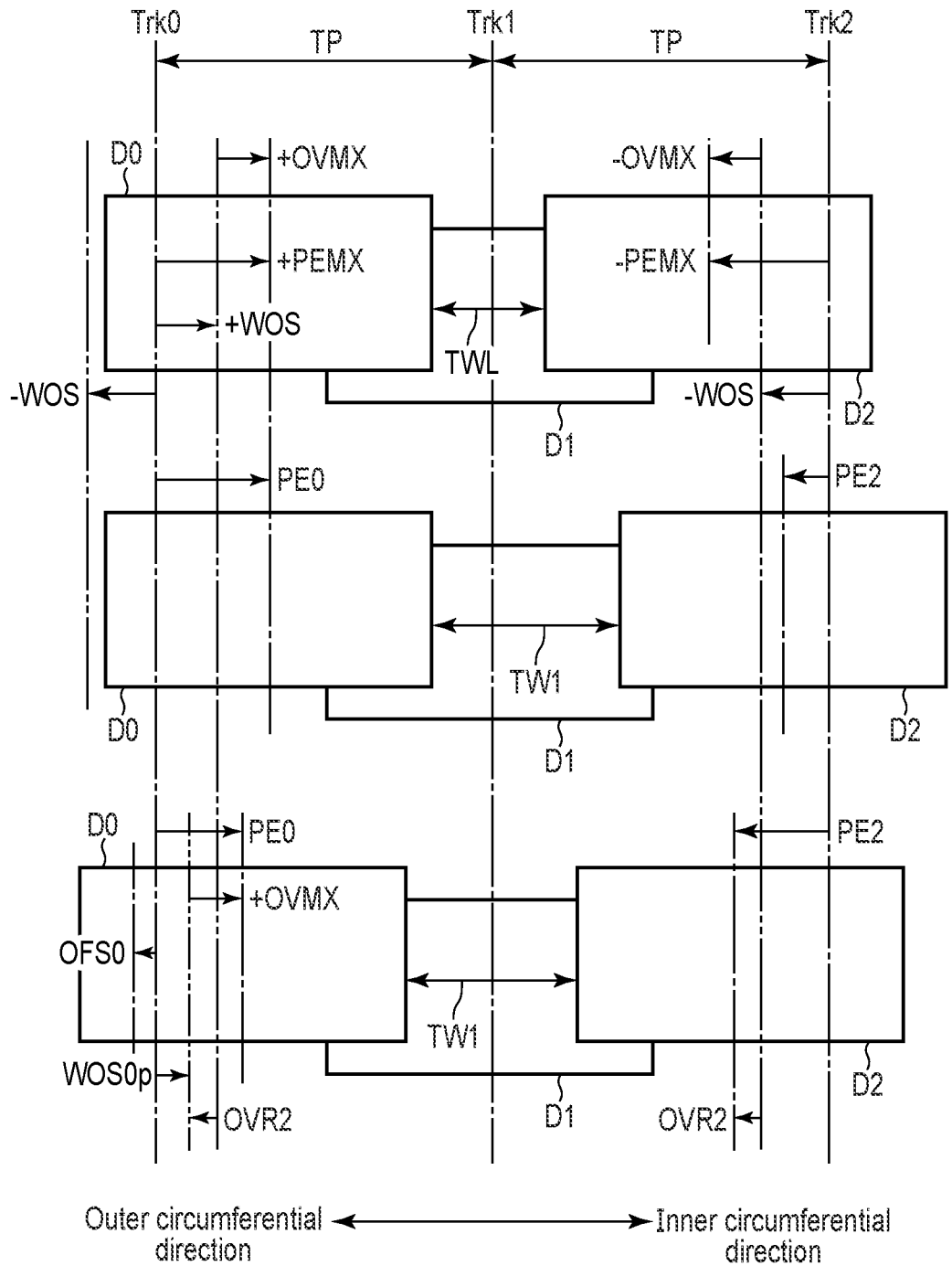
FIG. 11 is a view showing an example of a write process of a magnetic disk device according to a second embodiment.

FIG. 11 is a view showing an example of a write process of a magnetic disk device 1 according to a second embodiment. The upper part of FIG. 11 is a schematic diagram expressing the middle part of FIG. 2 with an offtrack slice absolute value WOS and an overrun maximum absolute value OVMX.

As shown in the upper part of FIG. 11, a default (predetermined) offtrack slice ±WOS is set in tracks Trk0, Trk1, and Trk2. The outer circumferential offtrack slice is −WOS and the inner circumferential offtrack slice is +WOS.

A positioning error in a data area D2 of the data written to track Trk2 is a maximum value in the outer circumferential direction and is expressed by the following expression.

$$-PEMX=-WOS-OVMX$$

A positioning error in a data area D0 of the data written to track Trk0 is a maximum value in the inner circumferential direction and is expressed by the following expression.

$$+PEMX=+WOS+OVMX$$

At this time, a track pitch TP is determined such that a track width of track Trk1 becomes a lower limit value TWL, and the track pitch TP is expressed by the following expression (15).

$$2TP=EW+TWL+2(WOS+OVMX) \quad (15)$$

A middle part of FIG. 11 shows a case where a positioning error PE2 of track Trk2 is already known and the positioning error PE2 does not exceed the outer circumferential offtrack slice −WOS.

At this time, when data is written to track Trk0 and a positioning error PE0 of the data area D0 exceeds the offtrack slice ±WOS on the inner circumferential side by the overrun maximum value OVMX, the positioning error PE0 is expressed by the following expression.

$$PE0=+WOS+OVMX=+PEMX$$

At this time, a track width TW1 of track Trk1 is expressed by the following expression, based on expression (3) and expression (14).

$$TW1=TWL+(WOS+OVMX)+PE2$$

The positioning error PE2 satisfies the following conditions.

$$PE2>-WOS$$

The track width TW1 is therefore expressed by the following expression.

$$TW1 TWL+OVMX$$

Based on the above expression, it is ensured that the track width TW1 has a margin greater than or equal to the overrun maximum absolute value OVMX with respect to the lower limit value TWL of the track width.

A lower part of FIG. 11 shows a case where the positioning error PE2 of track Trk2 is already known and the positioning error PE2 exceeds the outer circumferential offtrack slice −WOS.

At this time, an overrun amount OVR2 of the data area D2 is expressed by the following expression.

$$OVR2=PE2+WOS$$

A new inner circumferential offtrack slice WOS0p is generated by offsetting the offtrack slice on the inner circumferential side of track Trk0 from +WOS by OVR2. The offtrack slice WOS0p is expressed by the following expression.

$$WOS0p=2WOS+PE2 \quad (16)$$

When the positioning error PE0 of the data area D0 of the data written to track Trk0 exceeds the new inner circumferential offtrack slice WOS0p by the overrun maximum absolute value OVMX on the inner circumferential side, the positioning error PE0 is expressed by the following expression.

$$PE0=WOS0p+OVMX$$

The track width TW1 is expressed by the following expression (17), in consideration of the above expression, expression (3), and expression (14).

$$TW1=TWL+OVMX \quad (17)$$

Based on expression (17), it is ensured that the track width TW1 has a margin greater than or equal to the overrun maximum absolute value OVMX with respect to the lower limit value TWL of the track width.

Based on the above, when the positioning error PE2 of track Trk2 on two tracks inside from track Trk0 is already known, the track width of track Trk1 adjacent to the inner circumferential side can assure a margin greater than or equal to the overrun maximum absolute value OVMX with respect to the lower limit value TWL, by setting the offtrack slice WOS0p on the inner circumferential side of track Trk0, based on the positioning error PE2.

However, the absolute value of the new inner circumferential offtrack slice WOS0p of track Trk0 is smaller than or equal to the absolute value of the original inner circumferential offtrack slice ±WOS, and satisfies the following expression.

$$|WOS0p| \leq |+WOS|$$

In other words, since the new inner circumferential offtrack slice WOS0p is formed by narrowing the original inner circumferential offtrack slice ±WOS, the offtrack occurrence rate on the inner circumferential side increases, which may cause degradation in write performance.

Therefore, the positioning target position of track Trk0 is offset by the correction amount OFS0 such that the probability of exceeding the outer circumferential offtrack slice-WOS of track Trk0 toward the outer circumferential side and the probability of exceeding the new inner circumferential offtrack slice WOS0p toward the inner circumference side are balanced to be equivalent to each other. In other words, the target position may be offset by a correction amount OFS0 that satisfies the following expression.

$$OFS0-(-WOS)=WOS0p-OFS0$$

In other words, the correction amount OFS0 is expressed by the following expression (18).

$$OFS0=(WOS0p-WOS)/2 \quad (18)$$

Furthermore, the case where the outer circumferential offtrack slice-WOS of track Trk0 changes due to the inner circumferential positioning error on track Trkm2 on two tracks outside from track Trk0 is considered.

A correction amount OFS0 in the case where the outer circumferential offtrack slice-WOS and the inner circumferential offtrack slice ±WOS of track Trk0 change will be described with reference to FIG. 12.

Figure 12:
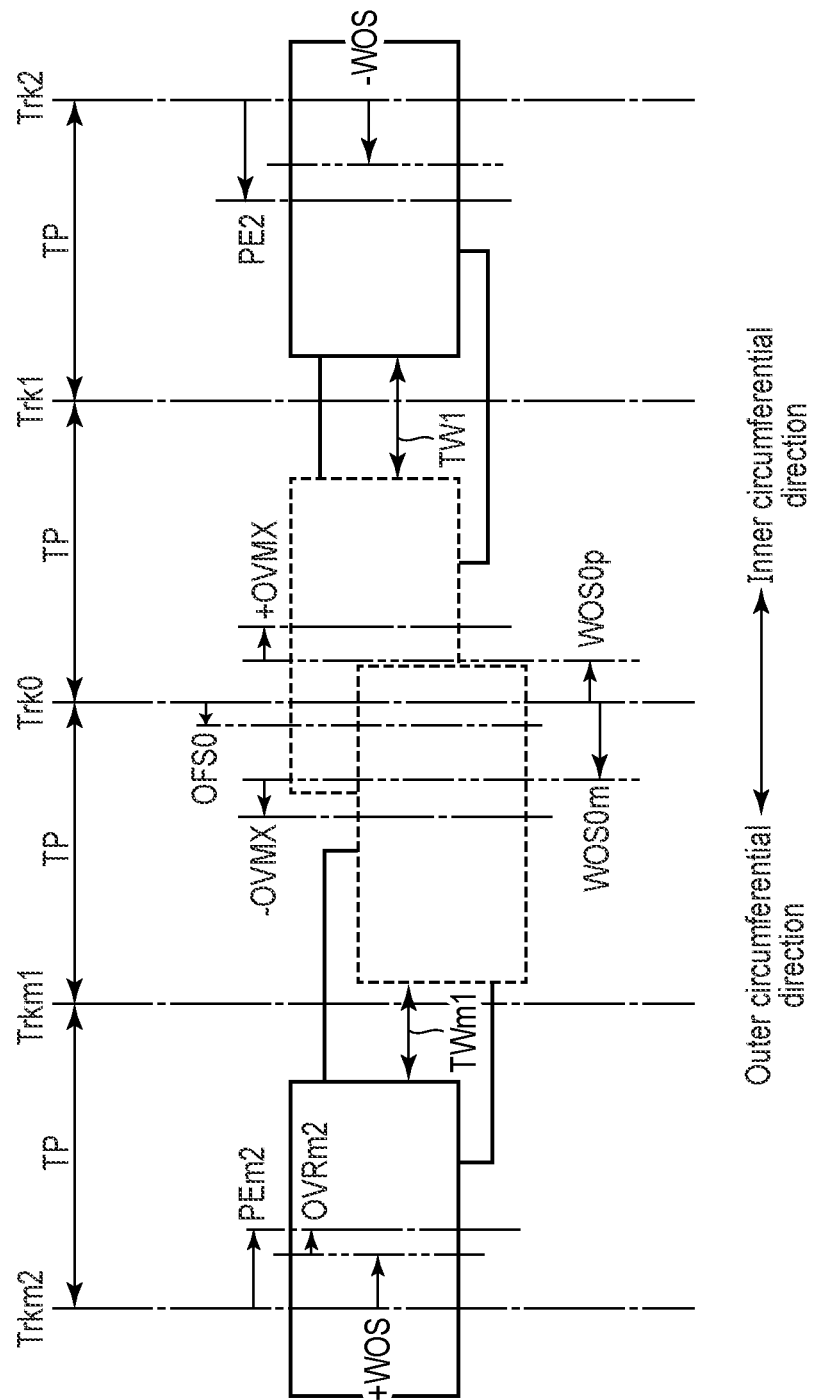
FIG. 12 is a view showing an example of a write process of the magnetic disk device according to the second embodiment.

As shown in FIG. 12, a positioning error PEm2 of track Trkm2 is already known and the positioning error PEm2 exceeds the inner circumferential offtrack slice ±WOS.

At this time, the overrun amount OVRm2 is expressed by the following expression.

$$OVRm2=PEm2-WOS$$

A new outer circumferential offtrack slice WOS0m is generated by offsetting the outer circumferential offtrack slice of track Trk0 from −WOS by OVRm2.

$$WOS0m=-WOS+OVRm2$$

In other words, the offtrack slice WOS0m is expressed by the following expression (19).

$$WOS0m=-2WOS+PEm2. \quad (19)$$

At this time, the probability of exceeding the inner circumferential offtrack slice WOS0p of track Trk0 toward the inner circumferential side and the probability of exceeding the outer circumferential offtrack slice WOS0m of track Trk0 toward the outer circumference side are balanced to be equivalent to each other. In other words, the target position may be offset by a correction amount OFS0 that satisfies the following expression.

$$OFS0-WOS0m=WOS0p-OFS0$$

In other words, the correction amount OFS0 is expressed by the following expression (20).

$$OFS0=(WOS0p+WOS0m)/2 \quad (20)$$

Next, a control configuration for calculating the target position will be described.

Figure 13:
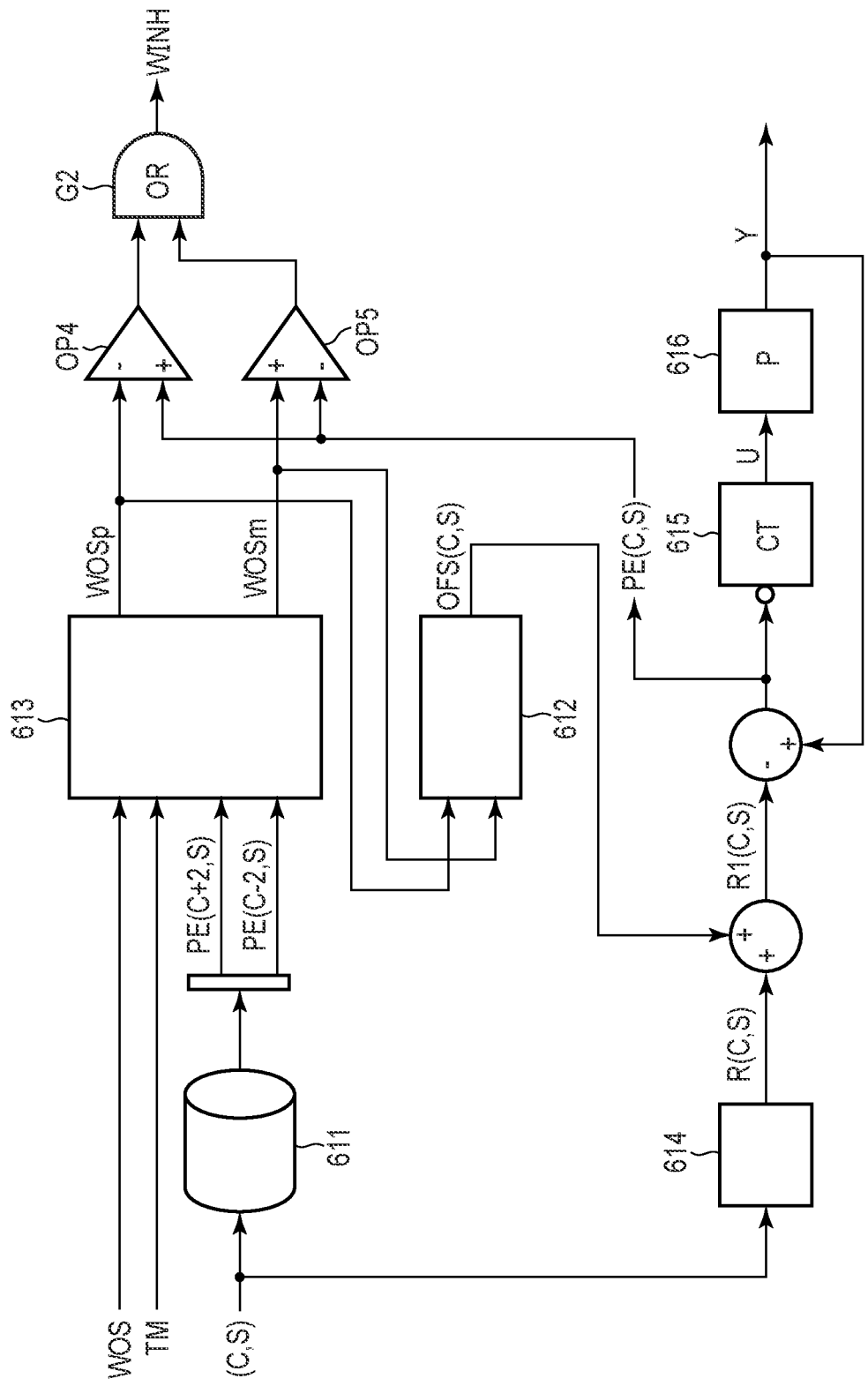
FIG. 13 is a block diagram showing an example of a control configuration of the magnetic disk device according to the second embodiment.

FIG. 13 is a block diagram showing an example of the control configuration of the magnetic disk device 1 according to the second embodiment, illustrating a write processing circuit C1 of the write control unit 610 in FIG. 1.

As shown in FIG. 13, the write processing circuit C1 of the write control unit 610 includes a tightening processing circuit 613, operational amplifiers OP4 and OP5, and an OR gate G2. Information on the positioning error PE (C+2, S) of the data written to two tracks inside from the target sector (C, S), information on the positioning error PE (C−2, S) of the data written to two tracks outside, a default TPI margin value TM, and a sector-independent default write offtrack slice absolute value WOS, are input to the tightening processing circuit 613. The tightening processing circuit 613 outputs offtrack slices WOSp and WOSm according to these inputs to the operational amplifiers OP4 and OP5.

If the positioning error PE (C+2, S) of the data in the sector (C+2, S) on two tracks inside does not exceed the outer circumferential default write offtrack slice-WOS on the outer circumferential side, the inner circumferential offtrack slice WOSp is the default value +WOS. If the positioning error PE (C+2, S) exceeds the outer circumferential default write offtrack slice-WOS, expression (16) is applied to the inner circumferential offtrack slice WOSp. In other words, the inner circumferential offtrack slice WOSp is expressed by the following expression.

$$WOSp=+WOS(PE(C+2,S) \geq -WOS)$$

$$WOSp=2WOS+PE(C+2,S)(PE(C+2,S)<-WOS)$$

In addition, if the positioning error PE (C−2, S) of the data in the sector (C−2, S) on two tracks outside does not exceed the inner circumferential default write offtrack slice ±WOS on the inner circumferential side, the outer circumferential offtrack slice WOSm is the default value-WOS. IF the positioning error PE (C−2, S) exceeds the inner circumferential default write offtrack slice ±WOS, expression (19) is applied to the outer circumferential offtrack slice WOSm. In other words, the outer circumferential offtrack slice WOSm is expressed by the following expression.

$$WOSm=-WOS(PE(C-2,S) \leq +WOS)$$

$$WOSm=-2WOS+PE(C-2,S)(PE(C-2,S)>+WOS)$$

The positioning error PE (C, S) of the target sector (C, S) is compared with the inner circumferential offtrack slice WOSp by the operational amplifier OP4, and compared with the outer circumferential offtrack slice WOSm by the operational amplifier OP5. If the positioning error PE(C, S) exceeds one of the offtrack slices WOSp and WOSm, a write inhibit flag (WINH) is output from the OR gate G2. When receiving the write inhibit flag WINH, a system controller 130 stops the write operation.

It is ensured by the above operation that the track widths of sectors (C+1, S) and (C−1, S) adjacent to the target sector (C, S) are greater than or equal to the lower limit value TWL.

In contrast, the tightening processing circuit 613 also outputs the offtrack slices WOSp and WOSm to a target position trajectory generation circuit 612. The target position trajectory generation circuit 612 performs the calculation of expression (20), based on the input offtrack slices WOSp and WOSm. The target position trajectory generation circuit 612 outputs the correction amount OFS(C, S) for the target position obtained from the calculation. The output correction amount OFS(C, S) is added to a physical target position R(C, S) to become a target position R1(C, S). The target position R1(C, S) is input to a differentiator.

Next, the correction amount OFS for the target position calculated by the target position trajectory generation circuit 612 will be described in detail.

Figure 14:
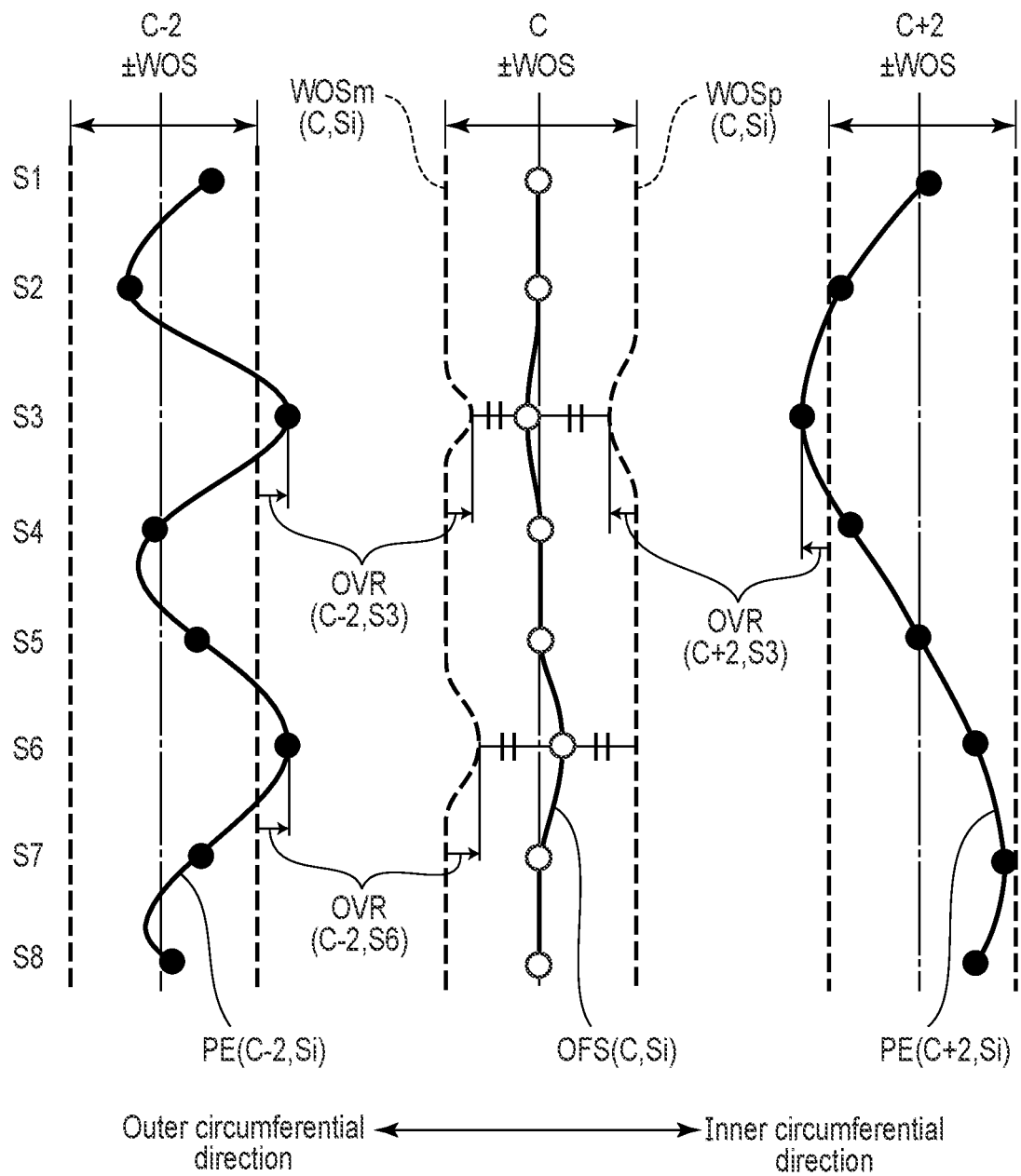
FIG. 14 is a schematic diagram showing a correction amount of a target position, a positioning error of data written to sectors on two tracks away from a target sector, and offtrack slices for the target sector.

FIG. 14 is a schematic diagram showing the correction amount OFS of the target position, the positioning error PE of the data written to sectors on two tracks away from a target sector, and offtrack slices WOSp and WOSm for the target sector.

As shown in FIG. 14, the data of the positioning error PE (C−2, Si) is written to the sector (C−2, Si) located on two tracks outside from the target sector (C, Si) (i=1, 2, . . . , 8), and the data of the positioning error PE (C+2, Si) is written to the sector (C+2, Si) located on two tracks inside from the target sector (C, S).

The positioning error PE (C−2, Si) and the positioning error PE (C+2, Si) can be referenced from the offtrack write table 611 and are indicated by black circles in the example shown in FIG. 14.

The correction amount OFS(C, Si) for the target position of the target sector (C, Si) is indicated by a white circle in the example shown in FIG. 14.

The inner circumferential offtrack slice WOSp and the outer circumferential offtrack slice WOSm for the target sector (C, S) are indicated by dashed lines in the example shown in FIG. 14.

First, the correction amount OFS(C, Si) based on the offtrack slices WOSm(C, Si) and WOSp (C, Si) in writing the target sectors (C, S1), (C, S2), (C, S4), (C, S5), (C, S7), and (C, S8) will be described.

None of the positioning errors PE (C−2, S1), PE (C−2, S2), PE (C−2, S4), PE (C−2, S5), PE (C−2, S7), and PE (C−2, S8) of the data in writing the sectors on two tracks outside from the target sector does not exceed the default inner circumferential offtrack slice ±WOS toward the inner circumferential direction. For this reason, each of the outer circumferential offtrack slices WOSm(C, S1), WOSm(C, S2), WOSm(C, S4), WOSm(C, S5), WOSm(C, S7), and WOSm(C, S8) in writing the target sectors (C, S1), (C, S2), (C, S4), (C, S5), (C, S7), and (C, S8) is the default value-WOS.

In addition, none of the positioning errors PE (C+2, S1), PE (C+2, S2), PE (C+2, S4), PE (C+2, S5), PE (C+2, S7), and PE (C+2, S8) of the data in writing the sectors on two tracks inside from the target sector does not exceed the default outer circumferential offtrack slice-WOS toward the outer circumferential direction. For this reason, each of the inner circumferential offtrack slices WOSp (C, S1), WOSp (C, S2), WOSp (C, S4), WOSp (C, S5), WOSp (C, S7), and WOSp (C, S8) in writing the target sectors (C, S1), (C, S2), (C, S4), (C, S5), (C, S7), and (C, S8) is the default value +WOS.

Based on the above, the correction amounts OFS(C, S1), OFS(C, S2), OFS(C, S4), OFS(C, S5), OFS(C, S7), and OFS(C, S8) of the target position are all zero.

Next, the correction amount OFS(C, Si) based on the offtrack slices WOSm(C, Si) and WOSp (C, Si) in writing the target sector (C, S3) will be described.

The positioning error PE (C−2, S3) in writing the sector (C−2, S3) on two tracks outside from the target sector (C, S3) exceeds the default inner circumferential offtrack slice ±WOS toward the inner circumferential direction. More specifically, the positioning error PE (C−2, S3) exceeds the offtrack slice ±WOS toward the inner circumferential direction by an overrun amount OVR (C−2, S3).

The overrun amount OVR (C−2, S3) is expressed by the following expression.

OVR(C−2,S3)=PE(C−2,S3)−WOS

Since the outer circumferential offtrack slice WOSm(C, S3) in writing the target sector (C, S3) is the value obtained by offsetting from the default value-WOS by the overrun amount OVR (C−2, S3), which is the excessive amount, the offtrack slice is expressed by the following expression.

WOS$m$(C,S3)=−2WOS+PE(C−2,S3)

In contrast, the positioning error PE (C+2, S3) in writing the sector (C+2, S3) on two tracks inside from the target sector (C, S3) exceeds the default outer circumferential offtrack slice-WOS toward the outer circumferential direction. More specifically, the positioning error PE (C+2, S3) exceeds the offtrack slice-WOS toward the outer circumferential direction by an overrun amount OVR (C+2, S3).

The overrun amount OVR (C+2, S3) is expressed by the following expression.

OVR(C+2,S3)=PE(C+2,S3)+WOS

Since the inner circumferential offtrack slice WOSp (C, S3) is the value obtained by offsetting from the default value +WOS by the overrun amount OVR (C+2, S3), which is the excessive amount, the offtrack slice is expressed by the following expression.

WOS$p$(C,S3)=+2WOS+PE(C+2,S3)

Since the correction amount OFS(C, S3) of the target position is the midpoint between the outer circumferential offtrack slice WOSm(C, S3) and the inner circumferential offtrack slice WOSp (C, S3), the correction amount is expressed by the following expression.

OFS(C,S3)=(WOS$p$(C,S3)+WOS$m$(C,S3))/2

Based on the above expression, the correction amount OFS(C, S3) can also be expressed by the following expression using the positioning errors PE (C+2, S3) and PE (C−2, S3).

OFS(C,S3)=(PE(C+2,S3)+PE(C−2,S3))/2

Next, the correction amount OFS(C, Si) based on the offtrack slices WOSm(C, Si) and WOSp (C, Si) in writing the target sector (C, S6) will be described.

The positioning error PE (C−2, S6) in writing the sector (C−2, S6) on two tracks outside from the target sector (C, S6) exceeds the default inner circumferential offtrack slice ±WOS. More specifically, the positioning error PE (C−2, S6) exceeds the offtrack slice ±WOS toward the inner circumferential direction by an overrun amount OVR (C−2, S6).

The overrun amount OVR (C−2, S6) is expressed by the following expression.

OVR(C−2,S6)=PE(C−2,S6)−WOS

Since the outer circumferential offtrack slice WOSm(C, S6) is the value obtained by offsetting from the default value-WOS by the overrun amount OVR (C−2, S6), which is the excessive amount, the offtrack slice is expressed by the following expression.

WOS$m$(C,S6)=−2WOS+PE(C−2,S6)

In contrast, the positioning error PE (C+2, S6) in writing the sector (C+2, S6) on two tracks inside from the target sector (C, S6) does not exceed the default outer circumferential offtrack slice-WOS. For this reason, the inner circumferential offtrack slice WOSp (C, S6) is the default value +WOS.

Since the correction amount OFS(C, S6) of the target position is the midpoint between the outer circumferential offtrack slice WOSm(C, S6) and the inner circumferential offtrack slice WOSp (C, S6), the correction amount is expressed by the following expression.

OFS(C,S6)=(WOS$m$(C,S6)+WOS)/2

Based on the above expression, the correction amount OFS(C, S6) can also be expressed by the following expression using the positioning errors PE (C−2, S6).

OFS(C,S6)=(−WOS+PE(C−2,S6))/2

Advantages of the second embodiment will be described.

According to the magnetic disk device 1 of the second embodiment, the magnetic disk device 1 corrects the positioning target position of the target sector according to the threshold values (offtrack slices WOSp and WOSm) determined based on the positioning error of the sector on two tracks away from the target sector. Therefore, dynamic target position movement can be obtained similarly to the first embodiment, and the same advantages as those of the first embodiment can be obtained.

In the second embodiment, the initial correction amount value OFS may be corrected to the optimum correction amount value OFSR that can correspond to the discontinuous positioning error, similarly to the modified example of the first embodiment. A modified example of the second embodiment will be described below.

Modified Example

Figure 15:
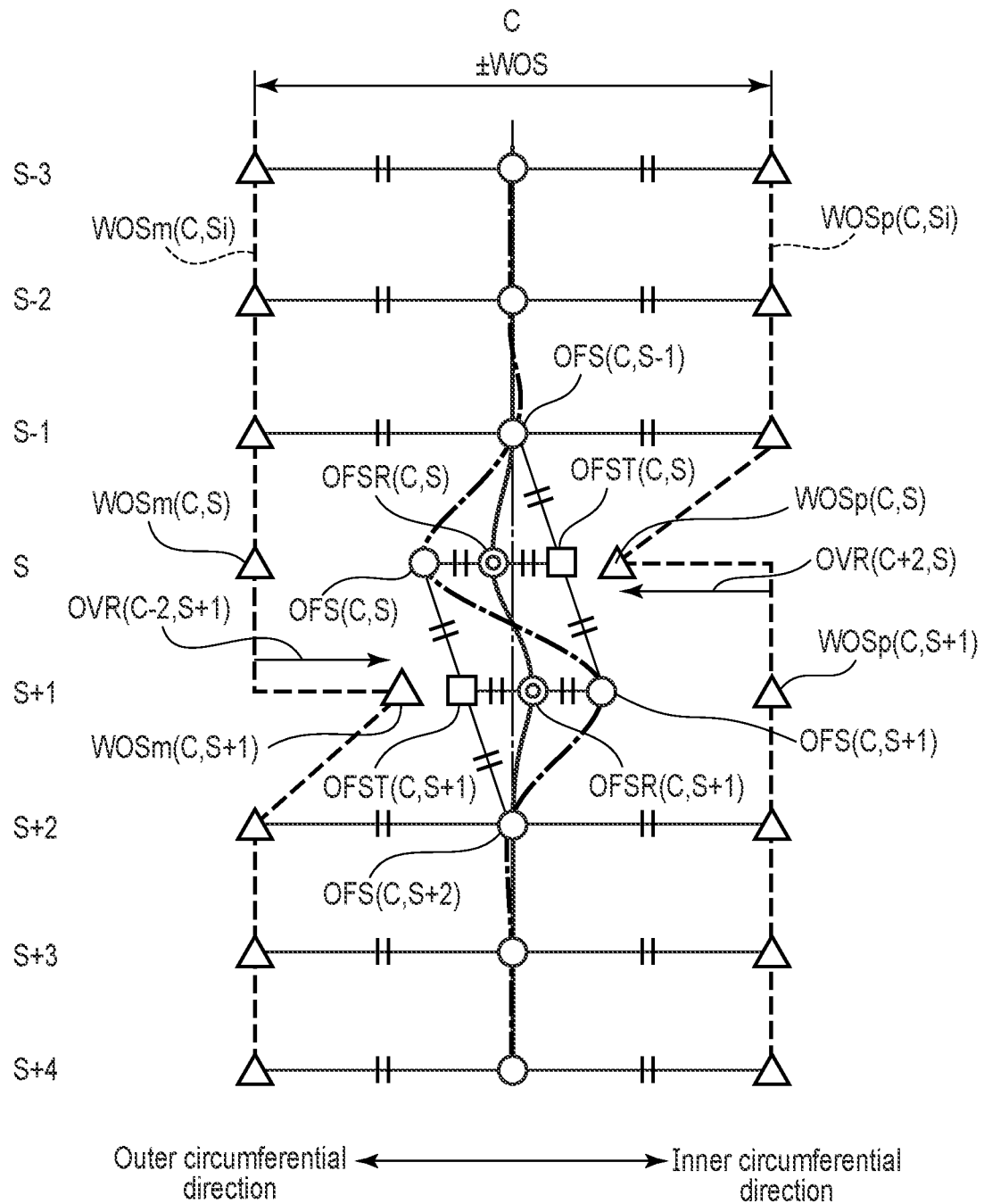
FIG. 15 is a schematic diagram showing a correction amount of the target position and the offtrack slices for the target sector.

FIG. 15 is a schematic diagram showing the correction amount OFS of the target position and the offtrack slices WOSp and WOSm for the target sector.

As shown in FIG. 15, the inner circumferential offtrack slice WOSp (C, S) is discontinuous with the inner circumferential offtrack slice WOSp (C, S+1), and the outer circumferential offtrack slice WOSm(C, S) is discontinuous with the outer circumferential offtrack slice WOSm(C, S+1).

When the discontinuous positioning errors occur in the sector (C−2, S) and the sector (C−2, S+1) (not shown) and the discontinuous positioning errors occur in the sector (C+2, S) and the sector (C+2, S+1) (not shown), the offtrack slices are the above-described discontinuous inner circumferential offtrack slices WOSp (C, S) and WOSp (C, S+1) and the outer circumferential offtrack slices WOSm(C, S) and WOSm(C, S+1).

The trajectories of the initial correction amount values OFS(C, S) and OFS(C, S+1) of the target position determined at the midpoint of the above-described offtrack slices have radical changes. The initial correction amount value OFS(C, S) is expressed by the following expression.

OFS(C,S)=(WOS$p$(C,S)+WOS$m$(C,S))/2

In the state shown in FIG. 15 as well, the auxiliary offset amount OFST (C, S) may be calculated from the initial correction amount values OFS(C, S−1) and OFS(C, S+1) of the sectors (C, S−1) and (C, S+1) adjacent in the circumferential direction of the target sector (C, S), and the optimum correction amount value OFSR(C, S) may be calculated from the initial correction amount value OFS(C, S) and the auxiliary offset amount OFST (C, S), similarly to the modified example of the first embodiment. The auxiliary offset amount OFST (C, S) and the optimum correction amount value OFSR(C, S) are expressed by the following expressions.

OFST(C,S)=(OFS(C,S−1)+OFS(C,S+1))/2

OFSR(C,S)=(OFS(C,S)+OFST(C,S))/2

The optimum correction amount value OFSR(C, S+1) for the target sector (C, S+1) can also be calculated in the same procedure. As described above, even if the positioning error of the data written to two tracks away is discontinuous, the data written to the sectors adjacent in the radial direction (in one example, sectors (C−1, Si) and (C+1, Si)) can be protected by correcting the initial correction amount value OFS to the optimum correction amount value OFSR.

In addition, expression (11) and expression (12) can also be applied in the same manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. A plurality of embodiments can also be combined as needed.

What is claimed is:

1. A magnetic disk device comprising:
a magnetic disk;
a magnetic head positioned in a track provided at a predetermined track pitch of the magnetic disk, writing data to the track, and reading data from the track; and
a controller including an offtrack write table, positioning the magnetic head, and registering an address at which data in the track is written and a positioning error of the magnetic head at the address for the track, in the offtrack write table,
wherein
when writing data to a first sector, the controller corrects a positioning target position of the first sector, based on a positioning error of a second sector located in two tracks away in a radial direction from the first sector.

2. The magnetic disk device of claim 1, wherein
when the second sector is in an unregistered state or data is written to the second sector before data written to a sector between the first sector and the second sector, the controller determines the second sector to be in an inactive state and sets a positioning error of the second sector to zero.

3. The magnetic disk device of claim 1, wherein
the controller corrects a positioning target position of the first sector, based on a positioning error of a third sector located in two tracks inside from the first sector and a positioning error of a fourth sector located in two tracks outside from the first sector.

4. The magnetic disk device of claim 3, wherein
the controller corrects the positioning target position of the first sector, based on a correction amount which is half of a value obtained by adding the positioning error of the fourth sector to the positioning error of the third sector.

5. The magnetic disk device of claim 4, wherein
when the third sector is in an unregistered state or data is written to the third sector before data written to a sector between the first sector and the third sector, the controller determines the third sector to be in an inactive state and sets the positioning error of the third sector to zero,
when the fourth sector is in an unregistered state or data is written to the fourth sector before data written to a sector between the first sector and the fourth sector, the controller determines the fourth sector to be in an inactive state and sets the positioning error of the fourth sector to zero, and
when the third sector or the fourth sector is in an inactive state, the controller corrects the positioning target position of the first sector to be offset to a side of the third sector or the fourth sector which is determined to be in the inactive state rather than the positioning target position corrected based on the correction amount.

6. The magnetic disk device of claim 4, wherein
with respect to a pair of sectors adjacent to the first sector in a circumferential direction orthogonal to the radial direction, the controller calculates an initial correction amount value which is half of a value obtained by adding a positioning error of a sector located in two tracks outside from the pair of sector to a positioning error of a sector located in two tracks inside from the pair of sectors,
the controller calculates an auxiliary offset amount which is half of a value obtained by adding an initial correction amount value of one of the pair of sectors to an initial correction amount of the other of the pair of sectors,
the controller calculates an optimum correction amount value which is half of a value obtained by adding the auxiliary offset amount to the correction amount, and
the controller corrects the positioning target position of the first sector, based on the optimum correction amount value.

7. The magnetic disk device of claim 4, wherein
the controller calculates an initial correction amount value which is half of a value obtained by adding a positioning error of a sector outside two tracks to a positioning error of a sector inside two tracks, for a predetermined number of sectors arranged in a first direction from the first sector and a predetermined number of sectors located in a second direction opposite to the first direction from the first sector, in a circumferential direction orthogonal to the radial direction,
the controller calculates an optimum correction amount value by linear combination of the initial correction amount value in the predetermined number of sectors with the correction amount, and
the controller corrects the positioning target position of the first sector, based on the optimum correction amount value.

8. The magnetic disk device of claim 3, wherein
the controller calculates a threshold value for determining whether or not to stop a write operation to the first sector, based on the positioning error of the third sector and the positioning error of the fourth sector, and
the controller corrects the positioning target position of the first sector, based on the threshold value.

9. A method of controlling a magnetic disk device comprising a magnetic disk, a magnetic head positioned in a track provided at a predetermined track pitch of the magnetic disk to write data to the track and read data from the track, and an offtrack write table, the method comprising:

positioning the magnetic head;
registering an address at which data in the track is written and a positioning error of the magnetic head at the address for the track, in the offtrack write table; and
when writing data to a first sector, correcting a positioning target position of the first sector, based on a positioning error of a second sector located in two tracks away in a radial direction from the first sector.

\* \* \* \* \*